(12) United States Patent
Wakamatsu

(10) Patent No.: US 8,965,191 B2
(45) Date of Patent: *Feb. 24, 2015

(54) SHAKE COMPENSATION APPARATUS, SHAKE COMPENSATION CONTROL METHOD, AND IMAGE CAPTURING APPARATUS AND CONTROL METHOD THEREOF

(75) Inventor: Nobushige Wakamatsu, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,104

(22) Filed: Jun. 8, 2012

(65) Prior Publication Data

US 2012/0315025 A1    Dec. 13, 2012

(30) Foreign Application Priority Data

Jun. 10, 2011  (JP) ................................. 2011-130614
Jun. 10, 2011  (JP) ................................. 2011-130615

(51) Int. Cl.
*G03B 17/00* (2006.01)
*H04N 5/232* (2006.01)

(52) U.S. Cl.
CPC ....... *H04N 5/23248* (2013.01); *H04N 5/23261* (2013.01); *H04N 5/23258* (2013.01)
USPC ......................................................... 396/55

(58) Field of Classification Search
USPC .................. 396/52, 53, 55; 348/208.1, 208.2, 348/208.4, 208.7, 208.11
See application file for complete search history.

(56) References Cited

U.S. PATENT DOCUMENTS

| 5,155,520 | A  | 10/1992 | Nagasaki et al. |
| 5,649,237 | A  | 7/1997  | Okazaki |
| 6,407,771 | B1 | 6/2002  | Kanbara et al. |
| 7,460,772 | B2 | 12/2008 | Ishikawa et al. |

(Continued)

FOREIGN PATENT DOCUMENTS

| JP | 7-225405 A    | 8/1995 |
| JP | 2010-25962 A  | 2/2010 |

(Continued)

OTHER PUBLICATIONS

Extended European Search Report issued Oct. 22, 2012 for corresponding EP12170164.3.

(Continued)

*Primary Examiner* — Clayton E Laballe
*Assistant Examiner* — Minh Phan
(74) *Attorney, Agent, or Firm* — Rossi, Kimms & McDowell LLP

(57) ABSTRACT

A shake compensation apparatus includes a shake compensation unit configured to compensate the shake by moving non-parallel to an optical axis; a driving unit configured to drive the shake compensation unit based on a drive indication signal; a position detection unit configured to detect the position of the shake compensation unit to output a position detection signal; and a compensation amount calculation unit configured to detect translational shake component in the shake of the apparatus from the movement of the shake compensation unit such that the drive indication signal and the position detection signal serve as input, and calculate the compensation amount of the shake compensation unit from the shake amount of the apparatus including the translational shake component to output it as a drive indication signal.

13 Claims, 25 Drawing Sheets

(56) References Cited

U.S. PATENT DOCUMENTS

| | | |
|---|---|---|
| 8,768,156 B2 | 7/2014 | Ohishi |
| 8,792,011 B2 | 7/2014 | Washisu et al. |
| 2007/0002146 A1 | 1/2007 | Tico et al. |
| 2009/0128636 A1 | 5/2009 | Wakagi et al. |
| 2009/0309985 A1 | 12/2009 | Ibi |
| 2010/0013937 A1 | 1/2010 | Washisu et al. |

FOREIGN PATENT DOCUMENTS

| | | |
|---|---|---|
| KR | 20060049600 A | 5/2006 |
| KR | 20080076827 A | 8/2008 |
| WO | 2010008061 A1 | 1/2010 |

OTHER PUBLICATIONS

Official Action issued in KR10-2012-0061355 mailed Jun. 19, 2014. English translation provided.

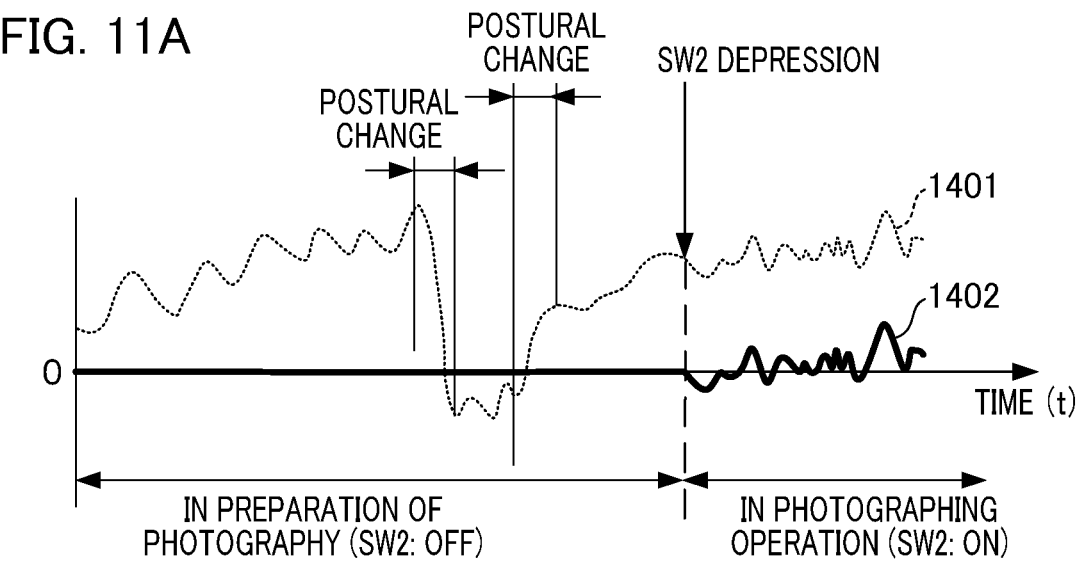
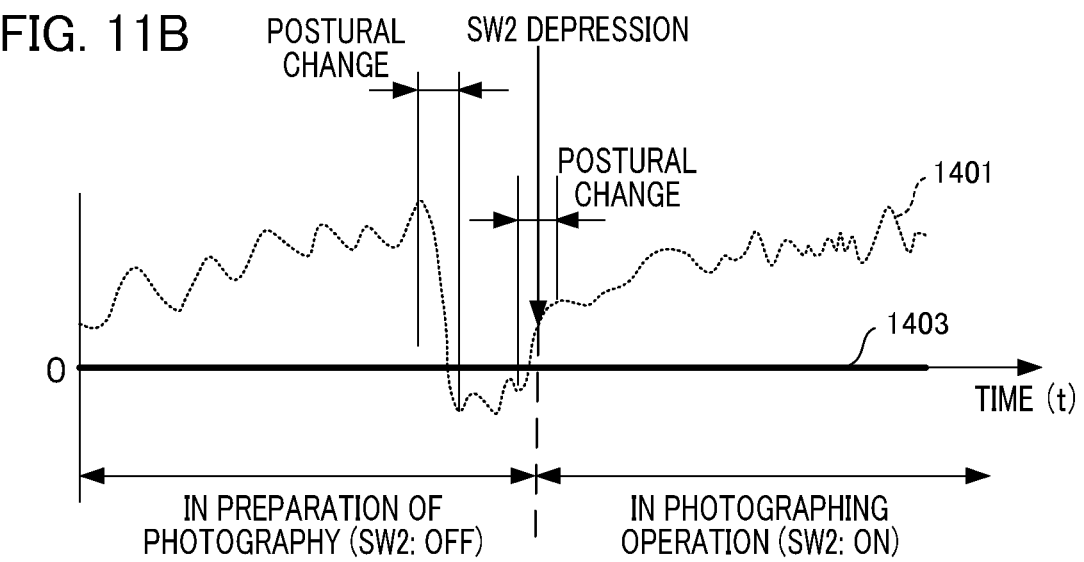

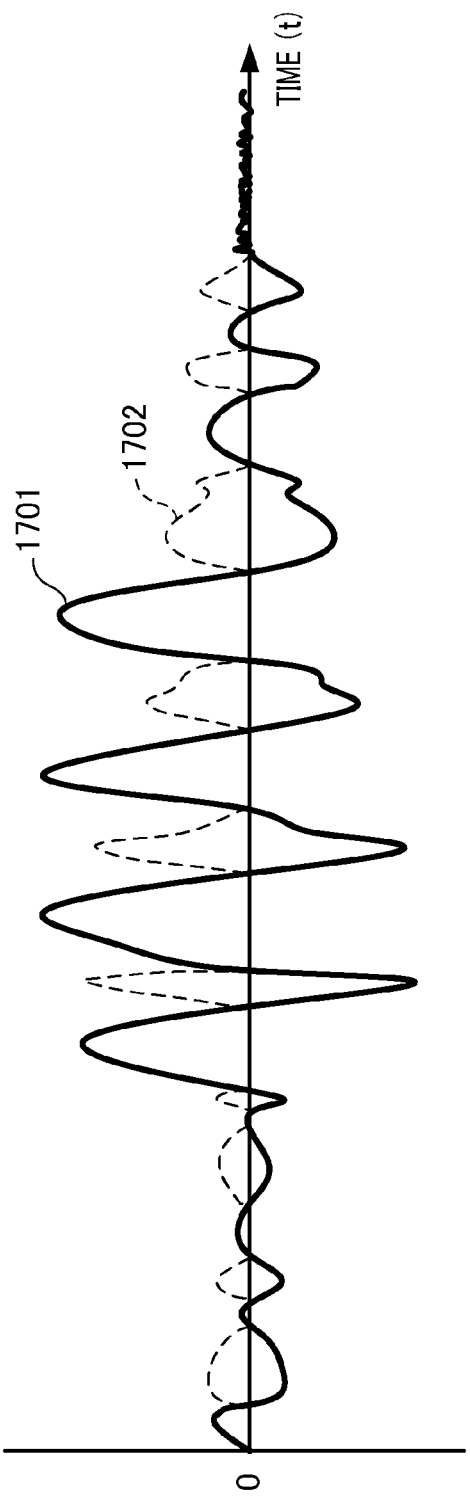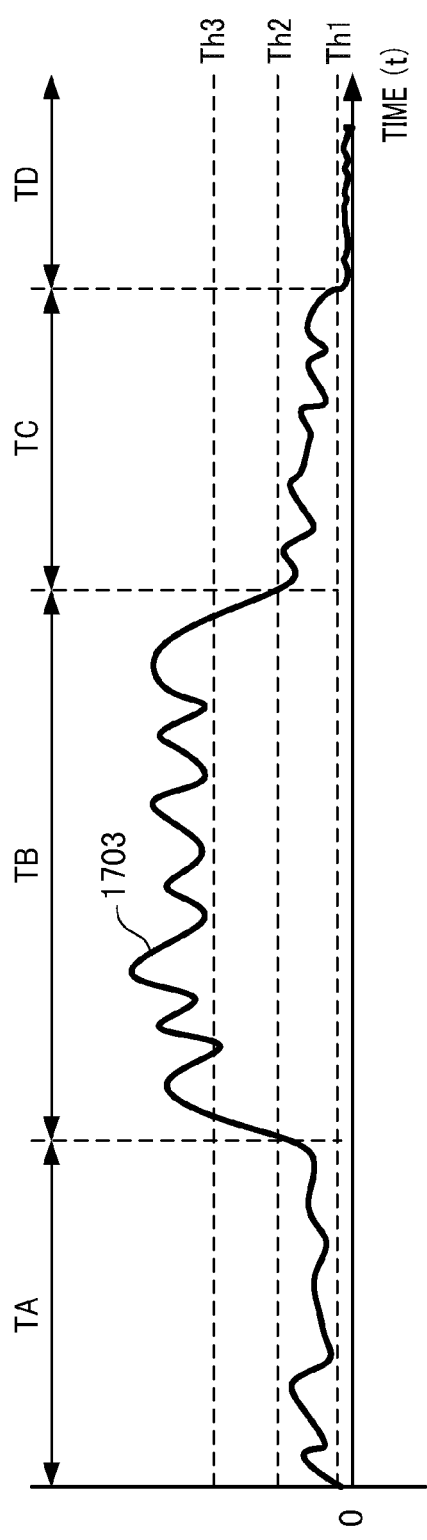

SHAKE COMPENSATION APPARATUS, SHAKE COMPENSATION CONTROL METHOD, AND IMAGE CAPTURING APPARATUS AND CONTROL METHOD THEREOF

BACKGROUND OF THE INVENTION

1. Field of the Invention

The present invention relates to a technique of image shake compensation due to a hand tremble and the like to prevent image deterioration.

2. Description of the Related Art

In order to prevent image shake due to a hand tremble and the like, cameras have been produced which comprise a vibration apparatus using a shake compensation unit, a driving unit and a vibration detection unit and the like, and there are fewer factors inducing a photographer to fail in photography.

A shake compensation apparatus will now be briefly described. A camera shake due to a hand tremble and the like is detected, and movement control of a lens for image shake compensation (hereinafter referred to as "compensation lens") or an imaging element is carried out depending on the detection value, so that photography without any image shake can be performed even when a hand tremble occurs in a photographing operation. In that case, it is necessary to detect vibration accurately to compensate changes on an optical axis due to the shake. Upon vibration detection, in principle, a vibration detection unit performs a calculation process on detection results such as acceleration, angular acceleration, angular velocity, angular displacement and the like. Image shake is suppressed by controlling a shake compensation unit based on the results of that calculation process to cause a compensation lens or an imaging element to move.

A shake compensation apparatus, which detects rotational shake among a hand tremble with an angular velocity meter to drive a compensation lens or an imaging element to reduce image shake, is mounted on various optical devices. However, in photography at close range (a photographing condition with a high photographing magnification), vibrations accompany which cannot be detected only with an angular velocity meter. That is, there is so-called translational shake applied in a horizontal or vertical direction within a plane perpendicular to the optical axis of a camera, and the image deterioration due to this can also not be ignored. For example, in the case of macro-photography in which a photographic subject is approached about 20 cm, it is necessary to positively detect and compensate translational shake. Moreover, even in photography for a photographic subject located at a distance of about 1 m, it is necessary to detect and compensate translational shake under a condition in which the focal distance of an imaging optical system is very great (for example, 400 mm).

Japanese Patent Laid-Open No. Hei7-225405 discloses a technique for calculating translational shake from a second-order integral of the acceleration detected with an acceleration meter to drive a shake compensation unit together with the output of a differently provided angular velocity meter. The output of an acceleration meter used for detection of translational shake is susceptible to environmental changes, such as disturbance noise, temperature change or the like. Therefore, those destabilizing factors are further enlarged by the second-order integration, and it is difficult to compensate translational shake at high precision.

Japanese Patent Laid-Open No. 2010-25962 discloses calculating translational shake on the supposition that it is considered as angular shaking when there is a rotation center at a location away from a camera. In this method, an angular velocity meter and an acceleration meter are provided; the compensated value and angle using the rotation radius of rotational shake from their outputs are calculated to perform shake compensation. By calculating a rotation center exclusively within the frequency bands unsusceptible to a disturbance, the reduction in precision due to the destabilizing factors of an acceleration meter as above can be ameliorated.

In the prior art, there are following situations in translational shake compensation.

In the method for which an acceleration meter is used as a detection means for performing translational shake compensation, it may lead to an increase in size and cost of a camera. Moreover, although it is desirable that the attachment position of an acceleration meter is a lens principal point position, it is difficult to install an acceleration meter in the vicinity of the lens principal point position.

Moreover, Japanese Patent Laid-Open No. 2010-25962 discloses a means of detecting shaking from the output of an imaging means, instead of an acceleration meter as a shake detection means. In the case of detecting shaking from the output of an imaging means, there is a method of calculating a compensation coefficient according to the relationship between image shake and rotational shake until just before a photographing operation, and multiplying the rotational shake by the compensation coefficient in a photographing operation. In this case, translational shake compensation can be performed only in a photographing operation. Moreover, in the shake compensation control by electronic image clipping, a compensation coefficient is calculated in moving image photography according to the relationship between image shake and rotational shake, and translational shake amount is calculated by multiplying the rotational shake by the compensation coefficient. Although it is possible to alter a clipping position of the image captured in an imaging element depending on the translational shake amount, there is a situation in which the angle-of-view unfavorably becomes narrow by clipping a portion of the image, and the like.

Moreover, Japanese Patent Laid-Open No. 2010-25962 also discloses a means of detecting the acceleration of translational shake from the current flowing through a driving coil, instead of an acceleration meter as a shake detection means. However, shake compensation control cannot be performed until just before a photographing operation in the means. If the influence of translational shake is great, such as in photography for a macro-area, it may be difficult to set a detailed composition and to accurately focus, and translational shake compensation cannot be performed in moving image photography. Moreover, since the characteristics of a shake compensation mechanism are not considered in the acceleration estimation by coil current values, there is a concern that accurately estimating acceleration may be difficult, and the estimation precision may be unfavorably reduced due to using the estimated acceleration for shake compensation.

Therefore, an object of the present invention is to provide a shake compensation apparatus and an image capturing apparatus being compact and highly mobile, and capable of performing very precise image shake compensation on translational shake even under a photographing condition with the attitude change of the apparatuses.

SUMMARY OF THE INVENTION

An aspect of the present invention is a shake compensation apparatus configured to compensate a shake by driving a shake compensation member, the apparatus comprising a shake compensation unit configured to compensate the shake by moving non-parallel to an optical axis, a driving unit configured to drive the shake compensation unit based on a drive indication signal, a position detection unit configured to detect the position of the shake compensation unit to output a position detection signal, and a compensation amount calculation unit configured to detect translational shake component in the shake of the apparatus from the movement of the shake compensation unit such that the drive indication signal and the position detection signal serve as input, and calculate the compensation amount of the shake compensation unit from the shake amount of the apparatus including the translational shake component to output it as a drive indication signal.

According to the present invention, highly precise compensation can be performed on translational shake without newly adding a sensor for translational shake detection, even under a photographing condition that accompanies an attitude change of a compact and highly mobile apparatus.

Further features of the present invention will become apparent from the following description of exemplary embodiments (with reference to the attached drawings).

BRIEF DESCRIPTION OF THE DRAWINGS

FIGS. 11A and 11B are timing charts illustrating translational shake compensation calculation according to a second embodiment of the present invention.

FIGS. 13A and 13B are diagrams illustrating the process of a wobble state determination unit according to a third embodiment of the present invention.

DESCRIPTION OF THE EMBODIMENTS

An image capturing apparatus according to each embodiment of the present invention is described below in accordance with the attached drawings. The present invention can be applied not only to a digital single-lens reflex and a digital compact camera, but also an photographing apparatus such as a digital video camera, a surveillance camera, a web camera, or a cellular phone.

Figure 1A:
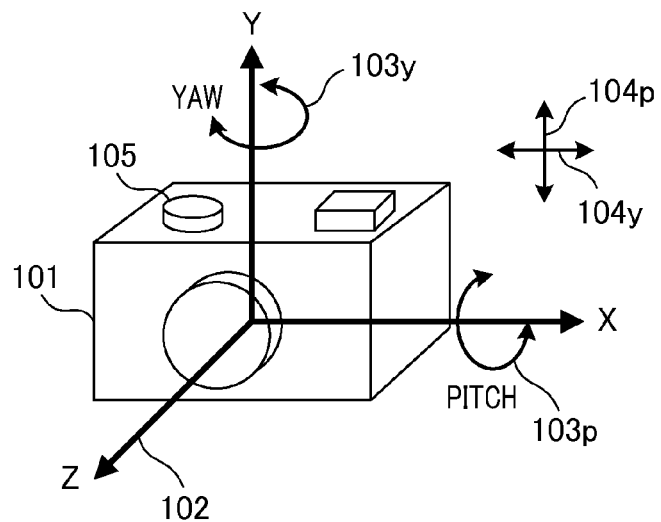
FIG. 1A is a diagram showing the shake directions of an image capturing apparatus.

FIG. 1A is a diagram representing the shake directions of an image capturing apparatus 101. A shake compensation apparatus performs shake compensation on the shaking caused in association with the rotation of the apparatus centered on an axis perpendicular to an optical axis 102 of an imaging optical system (hereinafter referred to as "rotational shake", see arrows 103p, 103y). The shake compensation apparatus also performs shake compensation on shaking caused in association with the rotation of the apparatus centered on shaking caused in association with the translation of the apparatus along a direction perpendicular to the optical axis 102 (hereinafter referred to as "translational shake", see arrows 104p, 104y). Furthermore, for the three-dimensional coordinate of X, Y, Z axes shown in FIG. 1A, a Z axis direction is aligned with an optical axis, and the two axes perpendicular thereto are X and Y axes. A direction around the X axis is a pitch direction (see the arrow 103p), and a direction around the Y axis is a yaw direction (see the arrow 103y). The direction of translational shake indicated by the arrow 104y is parallel to the X axis, and the direction of translational shake indicated by the arrow 104p is parallel to the Y axis.

[First Embodiment]

A first embodiment of the present invention is described below.

Figure 1B:
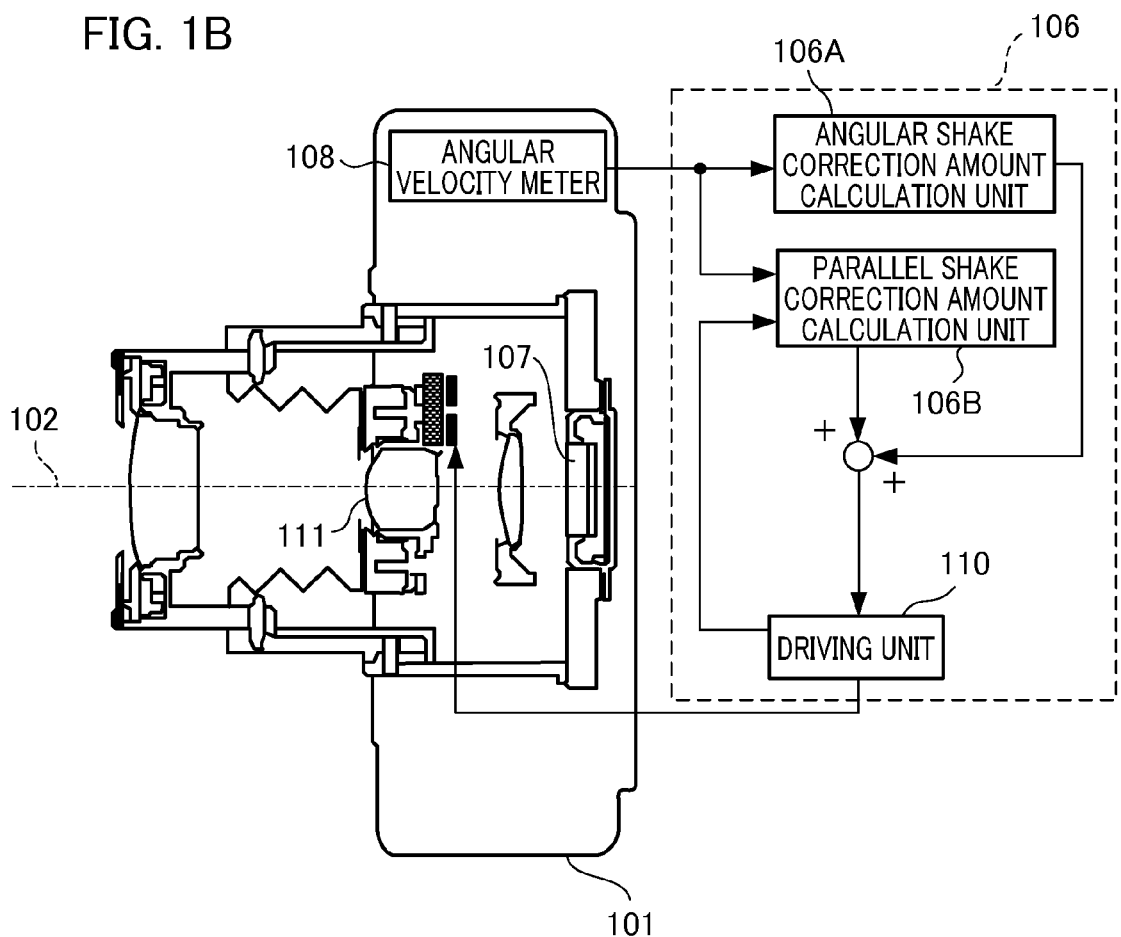
FIG. 1B is a diagram schematically showing an imaging element mounted with a shake compensation apparatus according to a first embodiment of the present invention.

FIG. 1B is a plan view schematically showing the image capturing apparatus 101 provided with a shake compensation apparatus according to the first embodiment. A configuration of the imaging unit of the image capturing apparatus 101 and a function block of the image shake compensation process executed in a CPU (Central Processing Unit) 106 are shown in FIG. 1B.

A compensation lens of a shake compensation unit 111 and an imaging element 107 are located on the optical axis 102 of the imaging optical system. The imaging element 107 converts a photographic subject image formed by the imaging optical system into an image. An angular velocity meter 108 is an angular velocity detection means of detecting rotational shake, and an angular velocity detection signal is output to a compensation amount calculation unit. Rotational shake compensation amount calculation unit 106A is a first compensation amount calculation means for calculating a compensation amount of image shake with respect to rotational shake. Moreover, translational shake compensation amount calculation unit 106B is a second compensation amount calculation means of calculating a compensation amount for image shake with respect to translational shake. The output of these compensation amount calculation units is transmitted to a driving unit 110 after addition. The driving unit 110 drives a compensation lens of the shake compensation unit 111, and performs shake compensation taking account of both of angular and translational shake.

In a conventional apparatus, a physical sensor such as an acceleration sensor is provided in order to detect translational shake indicated by the arrows 104p, 104y in FIG. 1A, and the detection signal is sent to the translational shake compensation amount calculation unit 106B. In contrast, in this embodiment, the detection of translational shake is performed using a signal output from the driving unit 110 to the translational shake compensation amount calculation unit 106B, instead of a physical sensor such as an acceleration sensor for translational shake detection. Furthermore, the details will be described below.

In an example shown in FIG. 1B, a compensation lens of the shake compensation unit 111 is moved within a plane perpendicular to the optical axis based on the calculated compensation amount, but a method of performing shake compensation by moving the imaging element within a plane perpendicular to the optical axis may also be used. Moreover, there is a method of ameliorating the influence of shaking by electronic shake compensation by altering a clipping position of the image of each photographic frame output by the imaging element, and image shake compensation can also be performed in combination with a plurality of shake compensation methods.

Next, a configuration example of the shake compensation unit 111 is described with reference to an exploded perspective view of FIG. 2.

A base 401 of the shake compensation unit 111 collectively holds a shutter mechanism, an ND filter mechanism. The base 401 is integrally provided with a follower pin 402, and also comprises a movable follower pin (not illustrated). Three cam grooves are formed on a cam cylinder (not illustrated) outside in a radial direction of the base 401. The follower pin 402 is fit into a cam groove and moves forward and backward along the cam groove in the optical axis direction, but the detail is omitted.

A compensation lens group 406 is integrally held by a shift lens holder 416 by a caulking nail (not illustrated). A lens cover 403 has an opening that restricts the optical flux passing through the compensation lens group 406, and an opening 405 is formed on each of three arms 404 provided on the sides. Protrusions 415 provided on three locations are formed on the sides of the shift lens holder 416, and by fitting these into the openings 405, respectively, the lens cover 403 is integrally held with the shift lens holder 416. Magnets 412, 413 that constitute an electro-magnetic mechanism are held by the shift lens holder 416.

The shift lens holder 416 is pressure-welded to the base 401 via three balls 407. That is, each ball 10 is a movable supporting member with respect to the shift lens holder 416. The shift lens holder 416 is freely movably supported with respect to the base 401 in a direction perpendicular to the optical axis by the rolling of each ball 10. According to this configuration, since an effect of being capable of achieving smaller amplitude is attained, a higher frequency of vibration can be obtained compared to a procedure using a guide bar, advantageous image shake compensation will be feasible in a digital camera that has an increasingly higher number of pixels.

A thrust spring 414 is a biasing means for biasing the shift lens holder 416 toward a direction close to the base 401. The thrust spring 414 is a tension spring, which one side engages with a hook nail of the shift lens holder 416, and the other engages with a hook nail (not illustrated) formed on the base 401. Moreover, radial springs 417, 418 are biasing means provided for preventing the rotation of the shift lens holder 416, and engage with hook nails (not illustrated) formed on the shift lens holder 416 and the base 401, respectively.

Coils 408, 409 are held by resinous bobbins 410, 411, respectively. A metallic pin is integrally configured on the tip of the bobbin, and the end of each coil is connected thereto. By soldering a conduction pattern of a flexible printed circuit (hereinafter abbreviated to "FPC") 424 to this metallic pin, power is provided from the circuit portion to each coil. In order to provide power to the coils 408, 409, the coils 408, 409 are electrically connected to the FPC 424 in a land 425 via the metallic pin. Hall elements 422, 423 are used as position detection means, and disposed in proximity to the magnets 412, 413, respectively, to detect a change in a magnetic field in association with the movements of the magnets. The movement amount of the shift lens holder 416 is calculable based on a magnetic detection signal. Hall elements 422, 423 are also implemented in the FPC 424, and power is provided thereto.

An FPC 426 is a wiring member for providing power to a shutter and an ND filter driving unit, and fixed to an FPC holder 420 in conjunction with the FPC 424. The FPC holder 420 is provided with a cylindrical protrusion 421, and fixed after the holes of the FPCs 424 and 426 have been press-fitted therein to perform the positioning thereof.

Figure 3:
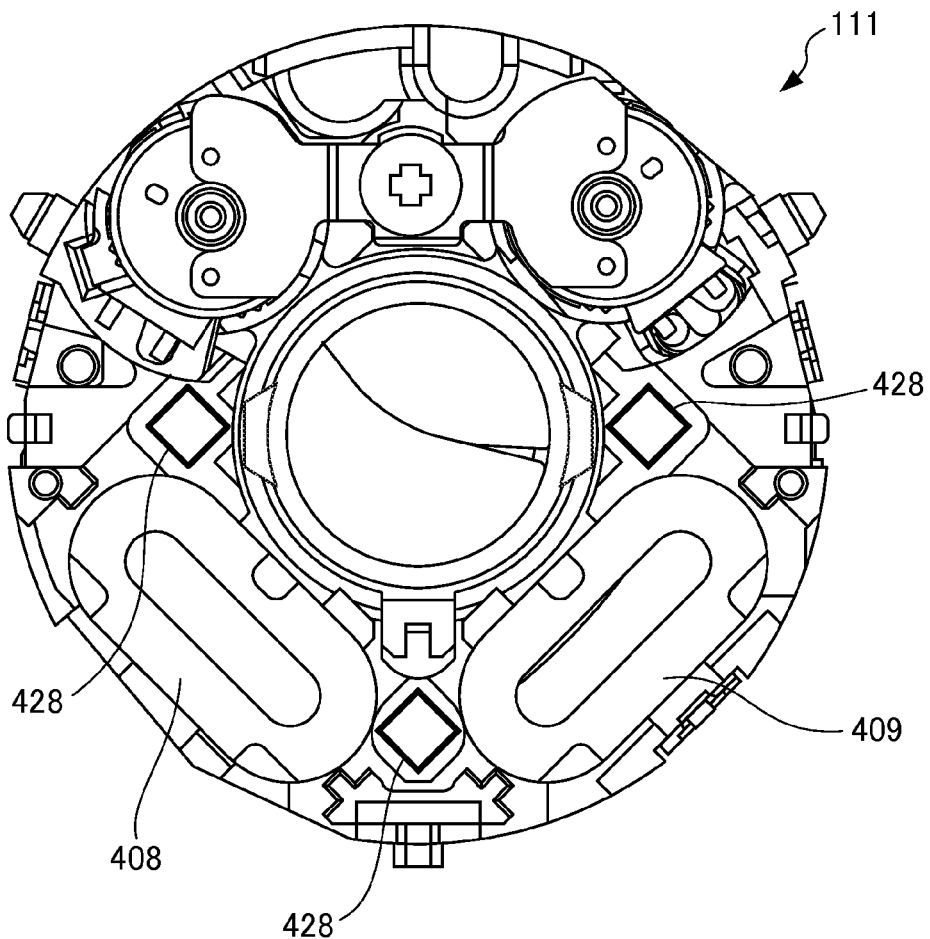
FIG. 3 is a diagram showing a shake compensation mechanism from a view in an optical axis direction.

FIG. 3 is a front view of the compensation unit 111 from a photographic subject's side.

Recesses 428 are receiving portions disposed in the positions of the three balls 407 located in the vicinity of a compensation lens, respectively, that is, on the apexes of the triangle. Each one of the balls 407 is received in the three recesses 428 formed on the base 401, and each ball is pressure-welded to the shift lens holder 416 via point contact. This configuration enables low frictional control by which a compensation lens is caused to follow the target position at high precision, and can enhance the estimation precision of translational shake.

Next, a control method for the compensation lens is described.

Figure 4:
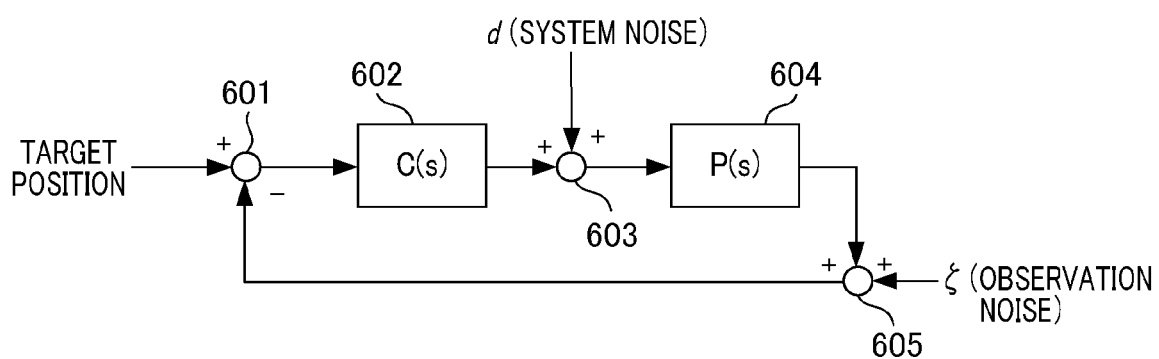
FIG. 4 is a block diagram showing a configuration example of the feedback control unit of a shake compensation mechanism.

FIG. 4 is a block diagram illustrating the calculation process of the driving unit 110.

The target position of the compensation lens group 406 is input to a subtraction unit 601. The subtraction unit 601 subtracts the current position indicated by a position detection signal from this target position to calculate the deviation. The position detection signal is a digital signal created by AD converting the output value of a position detection element such as a Hall element. At this point, observation noise (see zeta) is included in the output value of a Hall element and the like, and this is applied to an addition unit 605. The observation noise is the noise component affected by the noise possessed by a sensor itself, and electrical inductive noise from outside and the like, and a component of the observation noise will be applied to the actual position of a compensation lens as the output of a Hall element.

The deviation calculated by the subtraction unit 601 is output to a feedback control controller 602 (see C(s) in FIG. 4), and the controller performs control so as to bring this deviation to zero, that is, so that the position detected by a sensor follows the target position. However, after the system noise component (see d) has been applied to the output of the feedback control controller 602 in the addition unit 603, it is output to a shake compensation mechanism that is a plant 604 (see P(s) in FIG. 4), and the driving thrust will be applied thereto. The system noise is mainly a force disturbance due to the influence in gravitational acceleration caused by attitude change of an image capturing apparatus, and the influence of vibration acceleration caused by a hand tremble and the like. A compensation lens that constitutes the shake compensation mechanism is driven in accordance with the target position and the characteristics of the feedback control controller 602, the plant 604, while additionally being affected by the system noise and observation noise.

Next, a detection method for translational shake, using the shake compensation mechanism and the driving means thereof, is described.

Figure 5A:
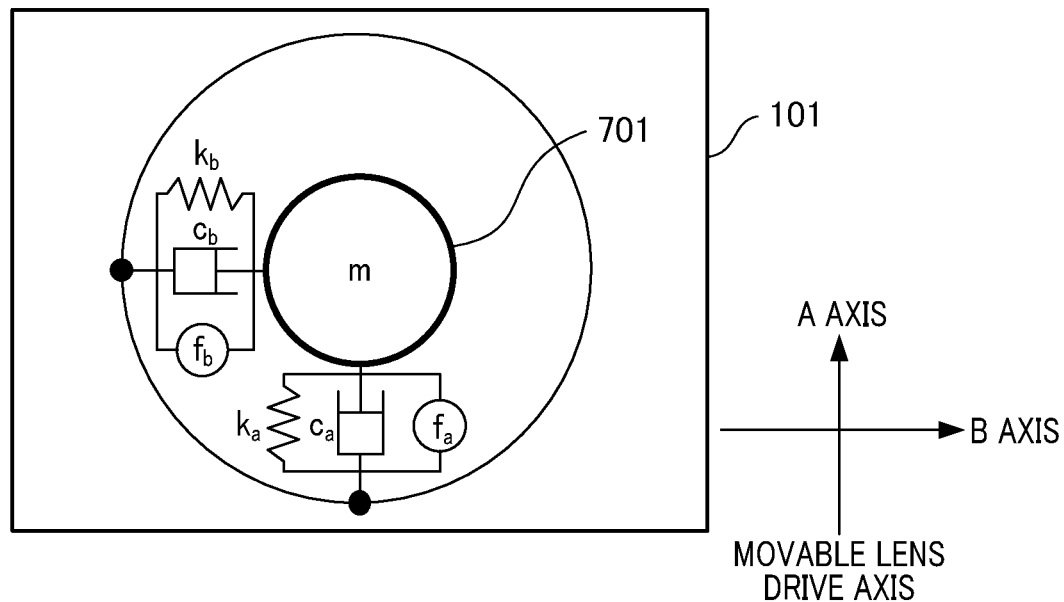
FIG. 5A is a diagram showing vibrations of the driven unit of a shake compensation mechanism by modeling.

First, for the shake compensation mechanism, the modeling of a plant is performed for the two axes perpendicular to each other, as shown in FIG. 5A. The orthogonal A and B axes each represent a drive axis of a movable lens (a compensation lens). A driven unit 701 of the shake compensation mechanism has inertial mass m, and is driven along each axis by the driving unit. In association with a first driving unit, a spring constant is represented as $k_a$, an attenuation coefficient as $c_a$, and the thrust as $f_a$; in association with a second driving unit, a spring constant is represented as $k_b$, an attenuation coefficient as $c_b$, and the thrust as $f_b$.

Figure 5B:
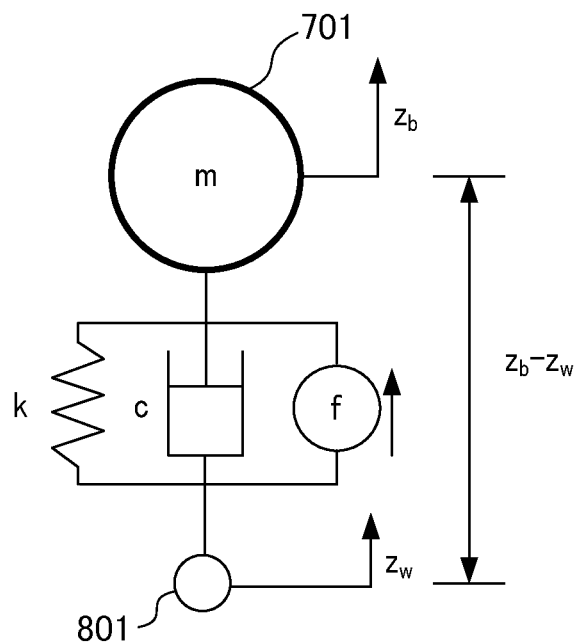
FIG. 5B is a diagram showing a single-degree-of-freedom vibration model.

FIG. 5B illustrates a vibration model of one axis of the above-described two axes. That is, it is a schematic diagram in which the vibration is modeled with a single-degree-of-freedom for a driven unit of the shake compensation mechanism including a compensation lens. In contrast with the driven unit 701 of the shake compensation mechanism, a fixing unit 801 refers to a portion that supports the driven unit (a camera body). In this model, the absolute displacement of the driven unit 701 including a compensation lens is denoted $z_b$, and the absolute displacement of the fixing unit 801 is denoted $z_w$. Moreover, in association with the driving unit, a spring constant is denoted k, an attenuation coefficient is denoted c, and the thrust caused by providing power to a coil of the shake compensation mechanism is denoted f. The motion equation of the model system for the driven unit 701 is as shown by the following formula (1) (mass m) in Newton's notation:

$$m \cdot \ddot{z}_b = -k \cdot (z_b - z_w) - c \cdot (\dot{z}_b - \dot{z}_w) + f \quad (1)$$

Figure 2:
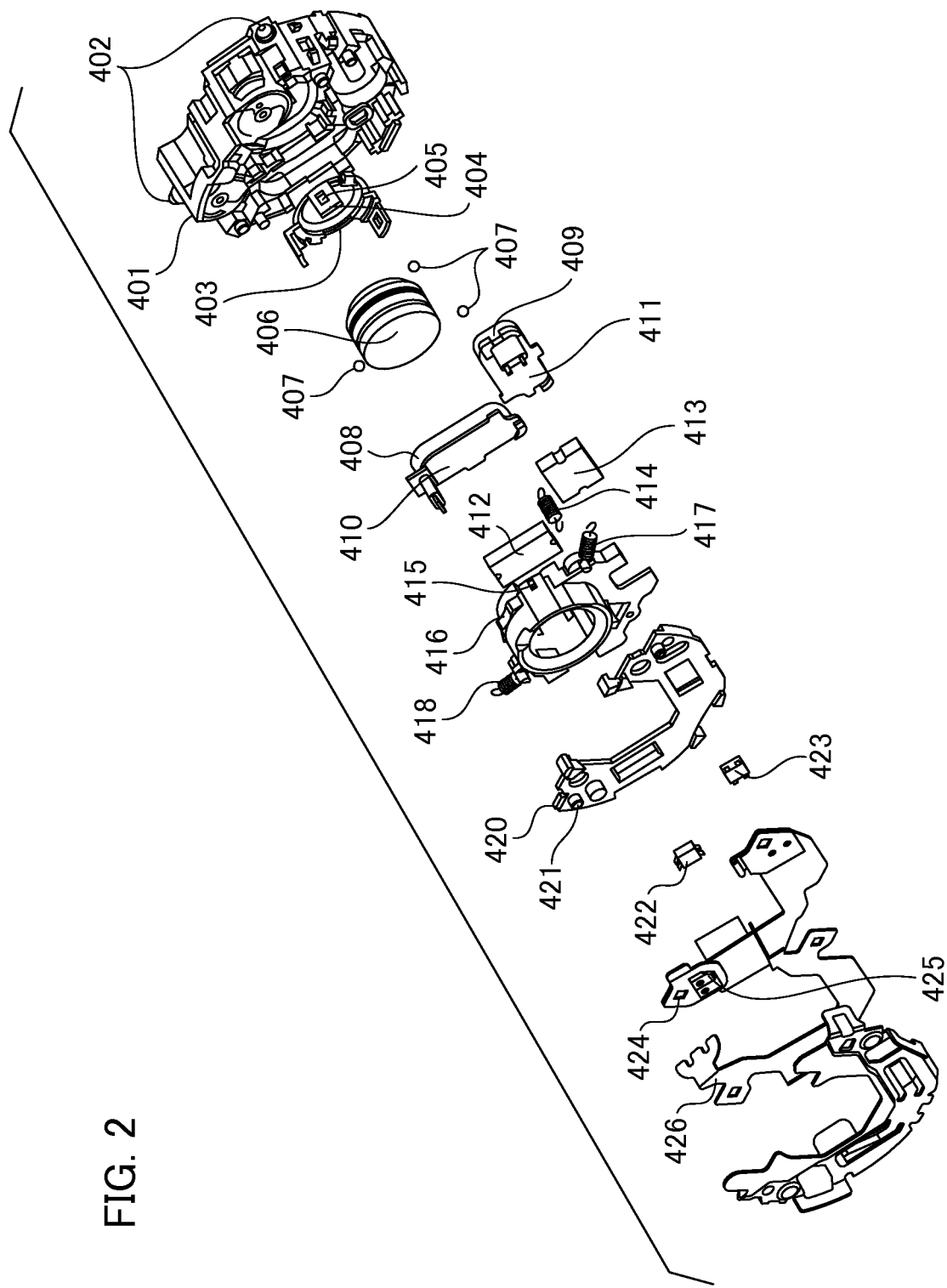
FIG. 2 is an exploded perspective view showing a configuration example for illustrating a shake compensation mechanism together with FIG. 3.

The relative displacement between the driven unit 701 and the fixing unit 801 of the shake compensation mechanism is detectable by a position detection element (see the Hall elements 422, 423 in FIG. 2). Thereupon, in order to consider the relative displacement between the driven unit 701 and the fixing unit 801 as observable output, the relative displacement between both of them is defined as $z_0$ in the following formula (2):

$$z_0 = z_b - z_w \quad (2)$$

The state variable is defined as follows:

$$x = [\dot{z}_b, z_0]^T$$

Here, $y = z_0$, $u = f$, and the absolute velocity of the fixation 801 is w.

$$w = \dot{z}_w$$

The following formula (3) is obtained as a state equation using the formula (1) and the above-described definitional identity (wherein t is a variable that represents time):

$$\dot{x}(t) = Ax(t) + Bu(t) + Gw(t)$$

$$y(t) = Cx(t) + Du(t) + v(t) \quad (3)$$

Nu in the above formula represents observation noise. This is Gaussian white noise, and the average value and covariance of w and nu are known. w and nu shall be represented by the following formula (4):

$$E[w(t)] = 0, E[w(t)w^T(\tau)] = Q\delta(t-\tau)$$

$$E[v(t)] = 0, E[v(t)w^T(\tau)] = R\delta(t-\tau) \quad (4)$$

A to D, and G in the formula (3) are represented as the following formula (5):

$$A = \begin{bmatrix} -\frac{c}{m} & -\frac{k}{m} \\ 1 & 0 \end{bmatrix},$$

$$B = \begin{bmatrix} \frac{1}{m} \\ 0 \end{bmatrix}, G = \begin{bmatrix} \frac{c}{m} \\ -1 \end{bmatrix},$$

$$C = [0 \ 1], D = [0]$$

(5)

Therefore, given that the relative displacement between the driven unit 701 and the fixing unit 801 of the shake compensation mechanism is measurable, an observer is configured as shown in the following formula (6) according to the formula (3):

$$\dot{\hat{x}} = A\hat{x} + Bu + L(y - C\hat{x}) \quad (6)$$

Here, L is the observer gain, which is the Kalman filter gain that has been previously obtained by solving the Riccati equation shown in the following formula (7):

$$AP + PA^T - PC^T R^{-1} CP + Q = 0 \quad (7)$$

Here, L is determined by this positive-definite symmetric solution P as the following equation (8):

$$L = PC^T R^{-1} \quad (8)$$

Using this observer means, the absolute velocity of the driven unit 701 of the shake compensation mechanism (first-order differential of $z_b$), which is a state variable, and the relative displacement $z_0$ between the driven unit 701 and the fixing unit 801, are estimable. By performing first-order differentiation on the estimated relative displacement $z_0$ and subtracting it from the absolute velocity of the driven unit 701, the absolute velocity of the fixing unit 801, that is, the camera body (first-order differential of $z_w$), is detectable. Furthermore, if a first-order differential of the estimated relative displacement $z_0$ is a very small value with respect to the absolute velocity of the driven unit 701, this may be directly used as the absolute velocity of the camera body for translational shake compensation. In this case, the above-described subtraction is unnecessary since $dz_b$ can be considered to be $dz_w$ because $dz_0$ is small.

Figure 6:
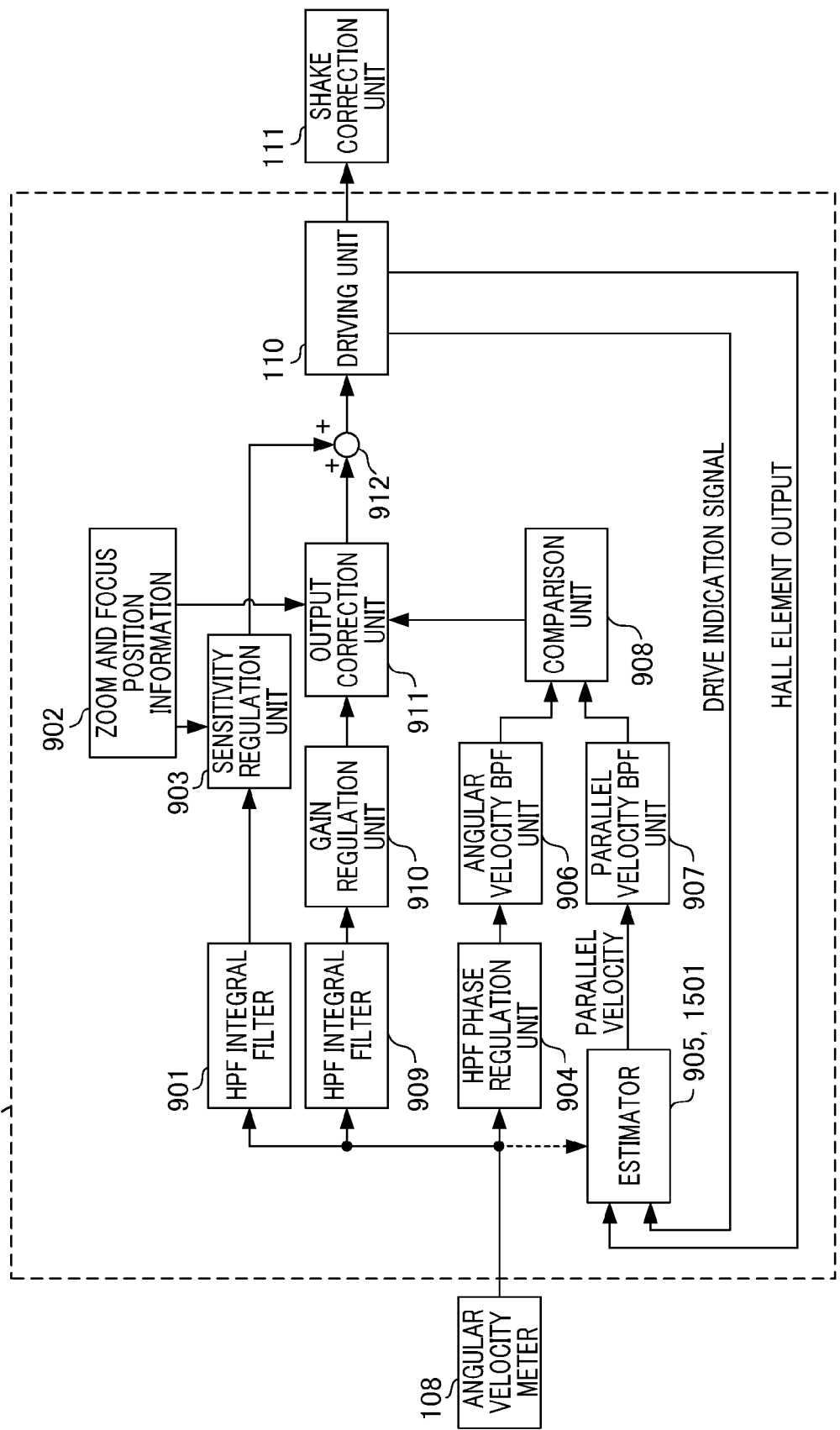
FIG. 6 is a block diagram showing a configuration example of a shake compensation apparatus according to a first embodiment of the present invention.

FIG. 6 is a block diagram showing a configuration example of a shake compensation apparatus. In the following description, a configuration is only shown for shaking caused in a vertical direction (pitch direction: see the arrows 103p, 104p in FIG. 1A) of an image capturing apparatus. Although a similar configuration is also provided for shaking caused in a horizontal direction (yaw direction: see the arrows 103y, 104y in FIG. 1A) of an image capturing apparatus, only one of them is described since, except for the difference in direction, both of them are fundamentally the same.

First, the compensation of rotational shake is described.

An angular velocity detection signal from the angular velocity meter is input to the CPU 106, and processed in an HPF integral filter 901. The angular velocity detection signal is converted into an angular signal by cutting the DC (Direct Current) component with an HPF (High-Pass Filter) that constitutes the HPF integral filter 901, and then integrating it. The frequency band of a hand tremble is about 1 to 10 Hz. Therefore, the HPF characteristics are the characteristics that cut a component with a frequency sufficiently remote from the frequency band of a hand tremble, e.g. of 0.1 Hz or less.

The output of the HPF integral filter 901 is input to a sensitivity regulation unit 903. The sensitivity regulation unit 903 amplifies the output of the HPF integral filter 901 to calculate the compensated target value of rotational shake, based on zoom and focus position information 902 and the photographing magnification obtained therefrom. This is to compensate the shake compensation sensitivity changing in an imaging plane with respect to a shake compensation stroke of the shake compensation unit 111, if the optical information changes due to the focus adjustment and zoom operation and the like of a photographing lens. The obtained compensated target value of rotational shake is output to the driving unit 110 via an addition unit 912, and the shake compensation unit 111 is driven, and the image shake is compensated by the movement control of a compensation lens. An estimator 905 calculates the parallel velocity (translational velocity) with the output of the angular velocity meter 108 being input together with a drive indication signal from the driving unit 110, the output of a Hall element.

Next, the translational shake compensation is described.

As described above in this embodiment, the parallel velocity (first-order differential of $z_w$) is detected by an observer using a Kalman filter. As described in formulae (1) to (8), the absolute velocity of the driven unit 701 and the relative displacement between the driven unit 701 and the fixing unit 801 are estimated considering the relative displacement between the driven unit 701 and the fixing unit 801 of the shake compensation unit 111 as a state variable, and the driving thrust as an input variable.

Figure 7:
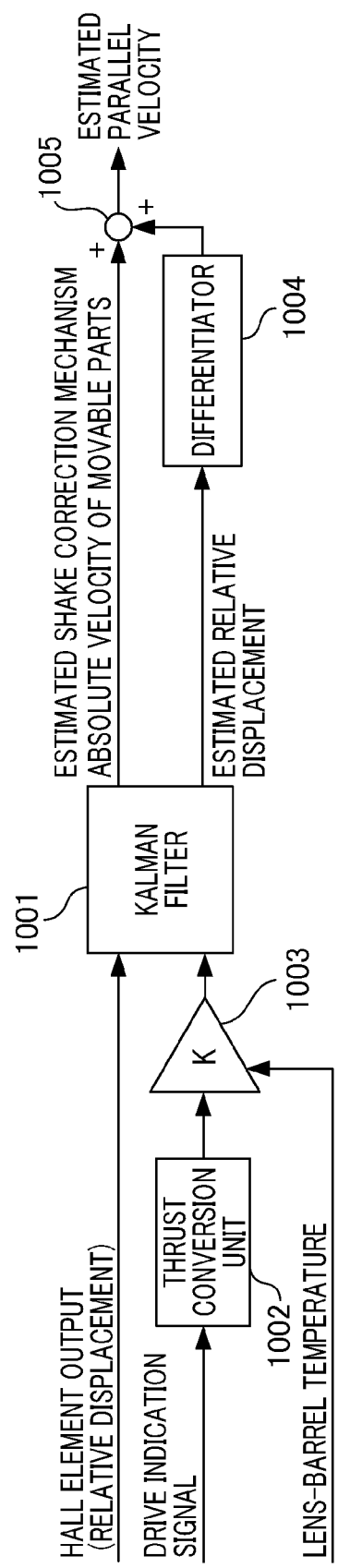
FIG. 7 is a block diagram showing a configuration example of an estimator in FIG. 6.

FIG. 7 is a control block diagram showing a configuration example of the estimator 905 in FIG. 6.

The information on the relative displacement output by Hall elements (see 422, 423 in FIG. 2), and the information on the thrust indicated by a drive indication signal from the driving unit 110 to the shake compensation unit 111, are input to a Kalman filter 1001. The drive indication signal includes the information relevant to a drive amount of the shake compensation unit 111, and the driving thrust is calculated in the following method. In order to convert the command current indicated by the feedback control controller 602 in FIG. 4 into thrust, a thrust conversion unit 1002 calculates the driving thrust by multiplying the current value by a predetermined coefficient. The output of the thrust conversion unit 1002 is input to a variable gain unit 1003 for temperature compensation. A temperature detection signal (a lens-barrel temperature signal) from a temperature sensor (not illustrated) provided near the shake compensation unit 111, is input to the variable gain unit 1003. A temperature change coefficient depending on the lens-barrel temperature has been previously stored in a memory, and the gain (K) is variably controlled depending on the temperature change. Therefore, the parallel velocity can be estimated by taking account of the temperature change of the coil output characteristics of the shake compensation unit 111 due to the lens-barrel temperature changing. The information on the driving thrust output by the variable gain unit 1003 and the information on the relative displacement output by a Hall element are input to the Kalman filter 1001. As described above, the Kalman filter 1001 estimates the absolute velocity of the driven unit 701 of the shake compensation unit 111 and the relative displacement between the driven unit 701 and the fixing unit 801. First-order differentiation is performed on the estimated relative displacement in a differentiator 1004 to be the relative velocity, and added to the estimated absolute velocity of the driven unit 701 in an addition unit 1005. Thereby, the estimated velocity of translational shake (hereinafter referred to as "estimated parallel velocity" or "estimated translational velocity") is calculated. Furthermore, although the calculation performed in the addition unit 1005 is subtraction in fact, addition (subtraction) for a negative value shall also be regarded as a similar calculation for convenience in description, when this does not need to be made explicit.

Returning to FIG. 6, a compensation method for translational shake is described.

The output of the angular velocity meter 108 is input to the CPU 106, and processed in an HPF integral filter 909. After the HPF that constitutes the HPF integral filter 909 has cut the DC component of an angular velocity detection signal, this signal is integrated and converted into an angular signal. The output of the HPF integral filter 909 is input to a gain regulation unit 910. The gain regulation unit 910 comprises a gain regulation filter, and regulates the gain and phase characteristics in the frequency band on which translational shake compensation should be performed, in conjunction with the process of the HPF integral filter 909. The output of the gain regulation unit 910 is compensated by an output compensation unit 911 described below, and regarded as the compensated target value for translational shake, synthesized in the addition unit 912, and added to the compensated target value of the previously described rotational shake.

In addition, in parallel with the above-described process, the output of the angular velocity meter 108 is input to an HPF phase regulation unit 904. The HPF that constitutes the HPF phase regulation unit 904 cuts the DC component of an angular velocity detection signal, and then the phase regulation of the signal is performed. Only a component with a frequency within a predetermined band is extracted from the output of the HPF phase regulation unit 904 in an angular velocity BPF (Band-Pass Filter) unit 906.

The output (estimated parallel velocity) of the estimator 905 is sent to a parallel velocity BPF unit 907, and a component with a frequency within a predetermined band is extracted therefrom. Each output of the angular velocity BPF unit 906 and the parallel velocity BPF unit 907 is input to a comparison unit 908, and a compensation amount (a compensation coefficient) that compensates the output of the gain regulation unit 910 is calculated. The compensation coefficient calculation performed by the comparison unit 908 will be described below.

The zoom and focus position information 902 is also input to the output compensation unit 911, and the photographing magnification is calculated from the information. The output of the gain regulation unit 910 is compensated based on the obtained photographing magnification and the compensation amount from the comparison unit 908, and the compensated target value of translational shake is calculated. The compensated target value of the translational shake is added to the compensated target value of rotational shake in the addition unit 912. The addition result is input to the driving unit 110, and thereby the shake compensation unit 111 is driven, and the image shake will be compensated for both of the rotational shake and the translational shake.

Next, a compensation amount calculated by the comparison unit 908 is described.

Figure 8:
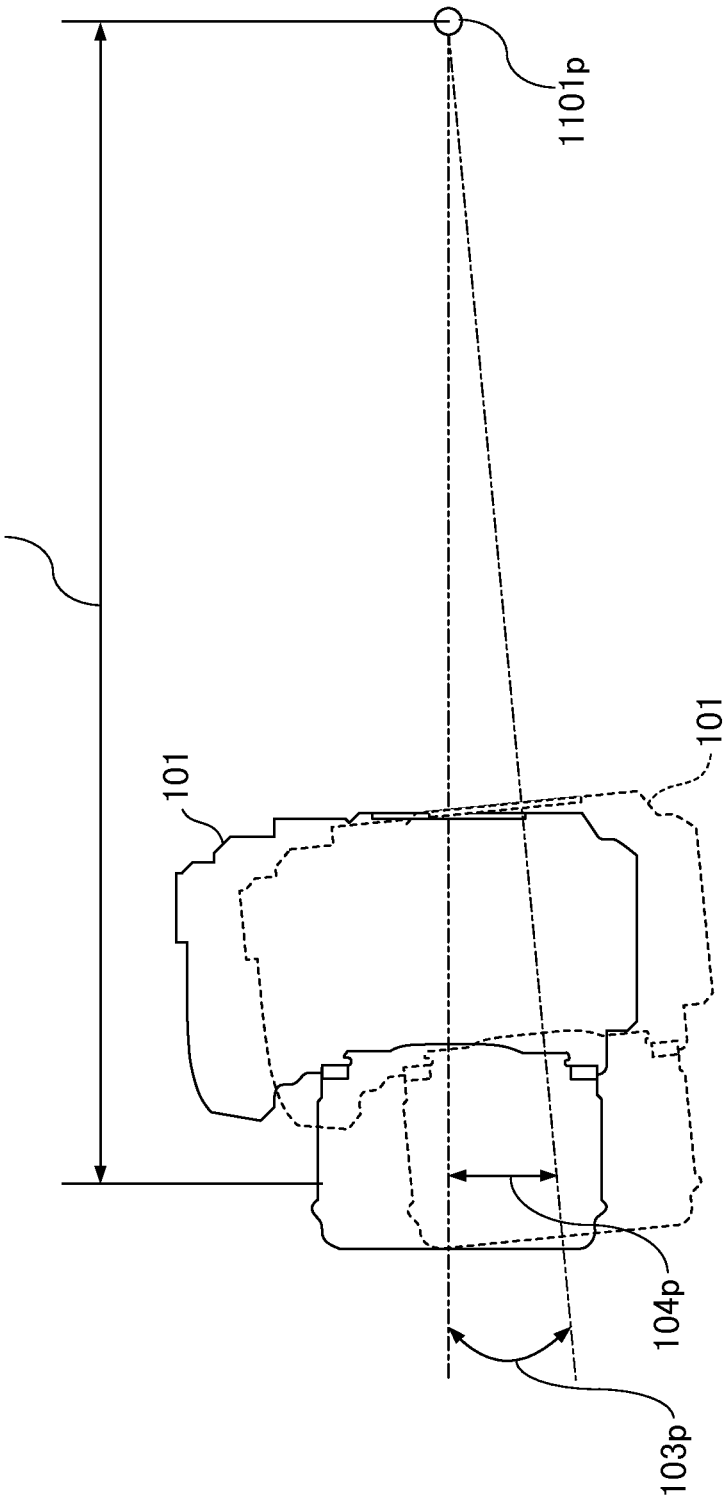
FIG. 8 is a diagram illustrating the rotation center of shaking applied to an image capturing apparatus.

FIG. 8 shows the rotational shake 103*p* and the translational shake 104*p* applied to an image capturing apparatus, which is a schematic diagram from a lateral view. The magnitude of the translational shake 104*p* at a principal point position of the imaging optical system of the image capturing apparatus 101 is written as Y. Moreover, the magnitude of the rotational shake 103*p* is written as theta, the rotation radius is written as L (see 1102*p*) when a rotation center O (see 1101*p*) has been set. The relationship therebetween is represented by the following formulae (9) and (10):

$$Y = L \times \theta \qquad (9)$$

$$V = L \times \omega \qquad (10)$$

Here, V represents velocity, and omega represents angular velocity. Furthermore, the rotation radius L (see 1102*p*) is the distance from the rotation center 1101*p* to a detecting unit for translational shake (in the shake compensation unit 111).

According to the formula (9), first-order integration is performed on the estimated parallel velocity (the estimated translational velocity) output by the estimator 905 to obtain the displacement Y, and first-order integration is performed on the output of the angular velocity meter 108*p* to obtain the angle theta, and the rotation radius L is obtained from the value of the ratio of both of them. Moreover, according to the formula (10), the estimated parallel velocity output by the estimator 905 is regarded as the velocity V, the output of the angular velocity meter 108*p* is regarded as the angular velocity omega, and the rotation radius L is obtained from the value of the ratio of both of them. The rotation radius L can be obtained by either method.

Upon the calculation of a rotation radius L, the peak value of the maximum amplitude of each of the velocity V and the angular velocity omega within the predetermined time may be obtained to calculate an L value from the ratio thereof. The predetermined time is, for example, about 200 ms of time if the cutoff frequency of the angular velocity BPF unit 906 and the parallel velocity BPF unit 907 is 5 Hz. Further, the renewal of the rotation radius L may be performed at every instant that the velocity V and the angular velocity omega are calculated, respectively. In that case, a high-frequency noise component can be removed in calculating the rotation radius by performing time-series averaging on the velocity V and the angular velocity omega, respectively, or cutting a high-frequency component with a LPF (Low-Pass Filter).

From the displacement Y of translational shake at a principal point position of the imaging optical system, the shake angle theta, and the focal distance f of an imaging optical system and the photographing magnification beta, the shake amount delta caused on an imaging plane is obtained by the following formula (11):

$$\delta = (1 - \beta) \times f \times \theta + \beta \times Y \qquad (11)$$

f and beta in the first term of the right side of the formula (11) are obtained from the position information 902 of zoom and focus, and the photographing magnification beta and the focal distance f obtained therefrom; and the shake angle theta is obtained from the result of integrating the output of the angular velocity meter 108*p*. Therefore, the rotational shake compensation can be performed as described in FIG. 6. Moreover, the second term of the right side of the formula (11) is obtained by performing first-order integration on the estimated parallel velocity output by the estimator 905, and the photographing magnification beta obtained from the position information 902 of zoom and focus. Therefore, the translational shake compensation can be performed as described in FIG. 6.

However, in this embodiment, the image shake compensation is performed on the shake amount delta, where the formula (11) is rewritten as the following formula (12):

$$\delta = (1 + \beta) \times f \times \theta + \beta \times L \times \theta \qquad (12)$$

That is, the displacement Y of translational shake directly obtained by the estimated parallel velocity output by the estimator 905 is not used for the translational shake. The rotation radius L obtained from the formula (9) or (10) is calculated, and a compensated value is calculated by multiplying this L value, the result of integrating the output of the angular velocity meter 108*p* (theta), and the photographing magnification beta. The compensation amount (beta, L), which is obtained by the comparison unit 908 in FIG. 6 using the compensation coefficient calculation and output to the output compensation unit 911, is the compensation coefficient with respect to theta.

Figure 9A:
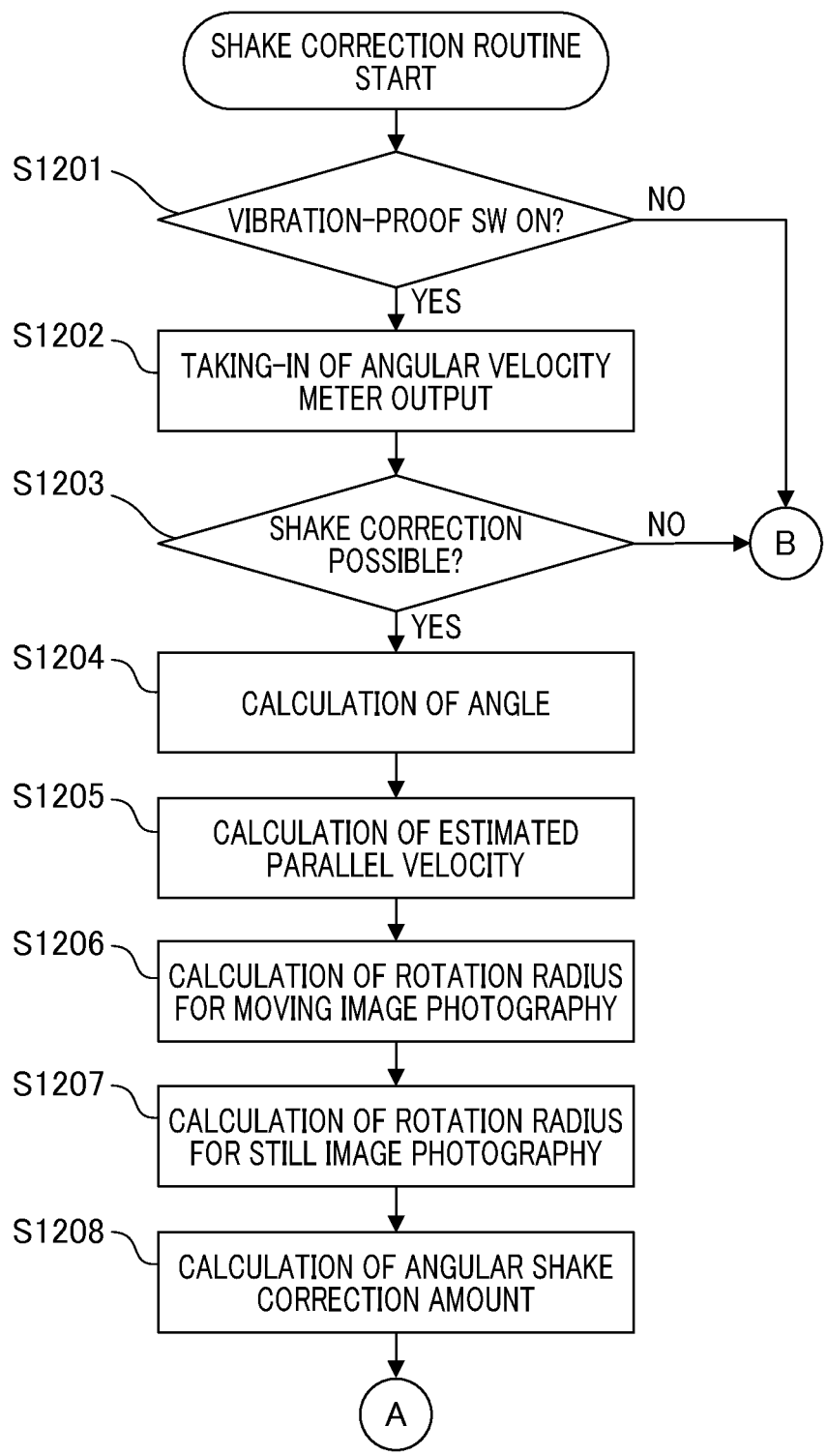
FIGS. 9A and 9B are flow charts illustrating an operation example of a shake compensation apparatus according to a first embodiment of the present invention.
Figure 9B:
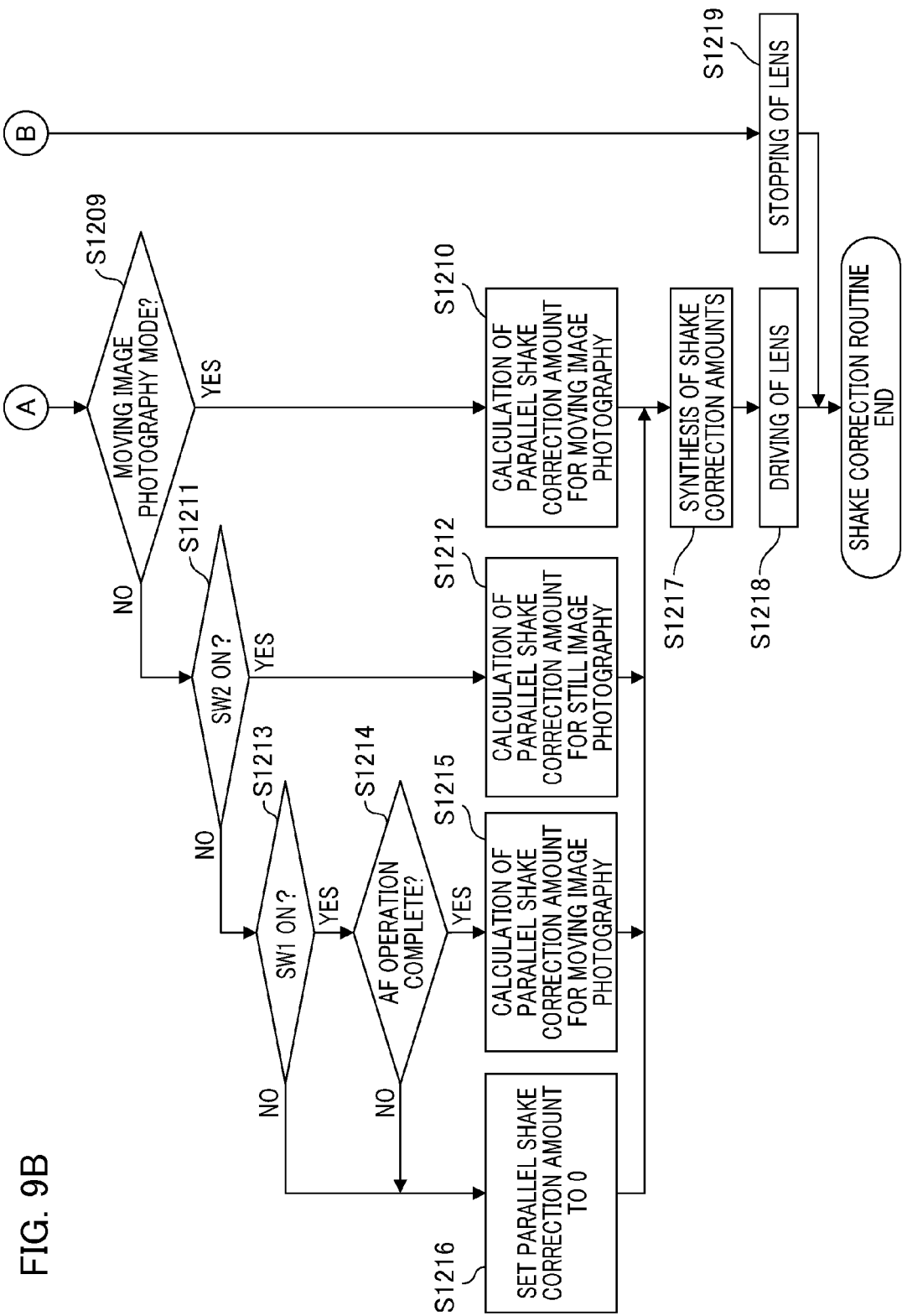

Next, the overall operation of shake compensation control is described with reference to FIGS. 9A and 9B. The flow chart shown in FIG. 9A starts with the ON operation of the main power source of an image capturing apparatus, and is executed in accordance with a program interpreted and executed by the CPU 106 in each fixed sampling period.

First, in S1201, it is determined if a shake compensation switch (SW) (not illustrated) has been operated by a user. The process proceeds to S1202 if the shake compensation SW is in the ON state, and proceeds to S1219 if it is in the OFF state. In S1202, the CPU 106 takes in a detection signal of the angular velocity meter 108. In next S1203, the CPU 106 determines if it is in a state in which shake compensation is possible; the process proceeds to S1204 if it is in a state in which the shake compensation is possible, and proceeds to S1219 if it is not in a state in which the shake compensation is possible. In S1203, it is determined that it is not in a state in which the shake compensation is possible from the time of power source supply until the output of the angular velocity meter 108 is stable. It is determined that it is in a state in which the shake compensation is possible after the output of the angular velocity meter 108 has been stable. Thereby, the reduction in shake compensation performance can be prevented in a state in which the output just after power source has been supplied is unstable.

In S1204, an angle is calculated with the method described using FIG. 6. This angle is an output value of the HPF integral filter 901 in FIG. 6. Next, in S1205, the estimator 905 calculates the estimated parallel velocity with the above-described method. Next, the comparison unit 908 calculates the rotation radius for moving image photography in S1206, and calculates the rotation radius for still image photography in S1207. At this point, the reasons why the rotation radii used in still image photography and moving image photography are separately calculated, respectively, are as follows. First, performing the translational shake compensation also in moving image photography, a compensation lens unfavorably reaches the edge of the movement range (control edge) if the shake influence applied to an imaging plane of translational shake is very great, such as in a macro-area and the like. The reason is that, since the compensation range is limited, a compensation lens unfavorably tends to go to the control edge if the shake amount is great. Therefore, the control of translational shake is set to a lower degree in moving image photography. For this reason, a limit is set on the rotation radius for moving image photography by altering the set of the maximum value of the rotation radius and the like, so that it is smaller than the rotation radius for still image photography.

Next, in S1208, the compensation amount of rotational shake is calculated based on the information on angle obtained in S1204, zoom and focus position information 902, and the photographing magnification obtained therefrom. Then, in S1209, the CPU 106 determines if the current mode is a moving image photography mode or a still image photography mode; the process proceeds to S1210 if it is the moving image photography mode, and the process proceeds to S1211 if it is the still image photography mode. In S1210, the translational shake compensation amount for moving image photography is calculated using the rotation radius for moving image photography. S1211 is a determination process for the operation state of a release button 105 (see FIG. 1). The release button 105 is provided with two-phase switches; a half push on the release button 105 brings a first switch (hereinafter referred to as "SW1") into the ON state, and a full push on the release button 105 brings a second switch (hereinafter referred to as "SW2") into the ON state. The CPU 106 checks if the SW2 is in the ON or OFF state; the process proceeds to S1212 if the SW2 is in the ON state, and the process proceeds to S1213 if the SW2 is in the OFF state.

In S1212, the translational shake compensation amount for still image photography is calculated using the rotation radius for still image photography. In S1213, the CPU 106 checks the state of the SW1; the process proceeds to S1214 if the SW1 is in the ON state, and the process proceeds to S1216 if the SW1 is in the OFF state. In S1214, the CPU 106 determines if the AF (Auto-Focus) operation is complete. The process proceeds to S1215 if the AF operation is complete, and the process proceeds to S1216 if the AF operation is not complete.

In S1215, the translational shake compensation amount for moving image photography is calculated using the rotation radius for moving image photography. Moreover, in S1216, the translational shake compensation amount is set to zero. After S1210, S1212, S1215, S1216, in S1217, the addition unit 912 (see FIG. 6) adds the rotational shake compensation amount and the translational shake compensation amount. In S1218, the driving unit 110 outputs a driving signal to the shake compensation unit 111 based on the calculated shake compensation amount, and the compensation lens is driven. Meanwhile, in S1219, the drive of the compensation lens is stopped. After S1218, S1219, the subroutine for shake compensation ends, and the waiting process operates until the next sampling time.

As above, in the first embodiment, the absolute velocity of the driven unit and the relative displacement between the driven unit and the fixing unit are estimated using the observer, in which the relative displacement between the driven unit and the fixing unit of the shake compensation mechanism as the state variable and the driving thrust to the shake compensation unit serve as the input variable. Then, the estimated parallel velocity is calculated to obtain the translational shake compensation amount. As described above, there is no need for newly providing an acceleration meter and the like since the shake compensation mechanism and the driving means thereof can be utilized. Therefore, downsizing and cost-saving can be realized, and the compensation of rotational shake and the compensation of translational shake can be concurrently performed, without adding a component.

In a conventional configuration in which an acceleration sensor is used for the detection of translational shake, a device is needed for the attachment position of the acceleration sensor. Originally, the acceleration which should be detected for translational shake compensation is the acceleration in a lens principal point position. However, an acceleration sensor must be attached to a location remote from a lens principal point position and an optical axis center (a control substrate in a camera body, etc.), if there is not a sufficient space around a photographic lens, and the attachment of the acceleration sensor is difficult. For this reason, there is a concern that the detection precision of an acceleration detection signal and translational shake amount will be reduced. In contrast, in this embodiment, since a translational shake amount can be calculated for the portion of the shake compensation mechanism, a translational shake amount is calculable near a lens principal point position and in an optical axis center, and the precision of translational shake compensation can be enhanced.

Furthermore, in this embodiment, moving a compensation lens as a shake compensation means in a plane perpendicular to an optical axis, that is, what is called "optical shake compensation", has been described. However, not only optical shake compensation, but also the following configurations may be used:

A configuration in which shake compensation is performed by moving an imaging element in a plane perpendicular to an optical axis;

A configuration by electronic shake compensation that ameliorates the influence of shaking by altering a clipping position of an image of each photographic frame output by an imaging frame; and A configuration in which shake compensation is performed by combining a plurality of shake compensation controls.

Moreover, each type of configuration is also possible for the estimation of translational shake. For example, in a case of using a shake compensation mechanism that performs shake compensation by moving an imaging element in a plane perpendicular to an optical axis, the estimated parallel velocity can be calculated by an observer if the relative displacement between a driven unit and a fixing unit of the shake compensation mechanism can be observed. That is, the absolute velocity of the camera body is detectable with a method similar to the one above, if the observer is configured such that the relative displacement between the driven unit and the fixing unit of the shake compensation mechanism serves as the state variable, and the driving thrust to the shake compensation unit as the input variable.

[Second Embodiment]

Next, a second embodiment of the present invention is described.

Figure 10:
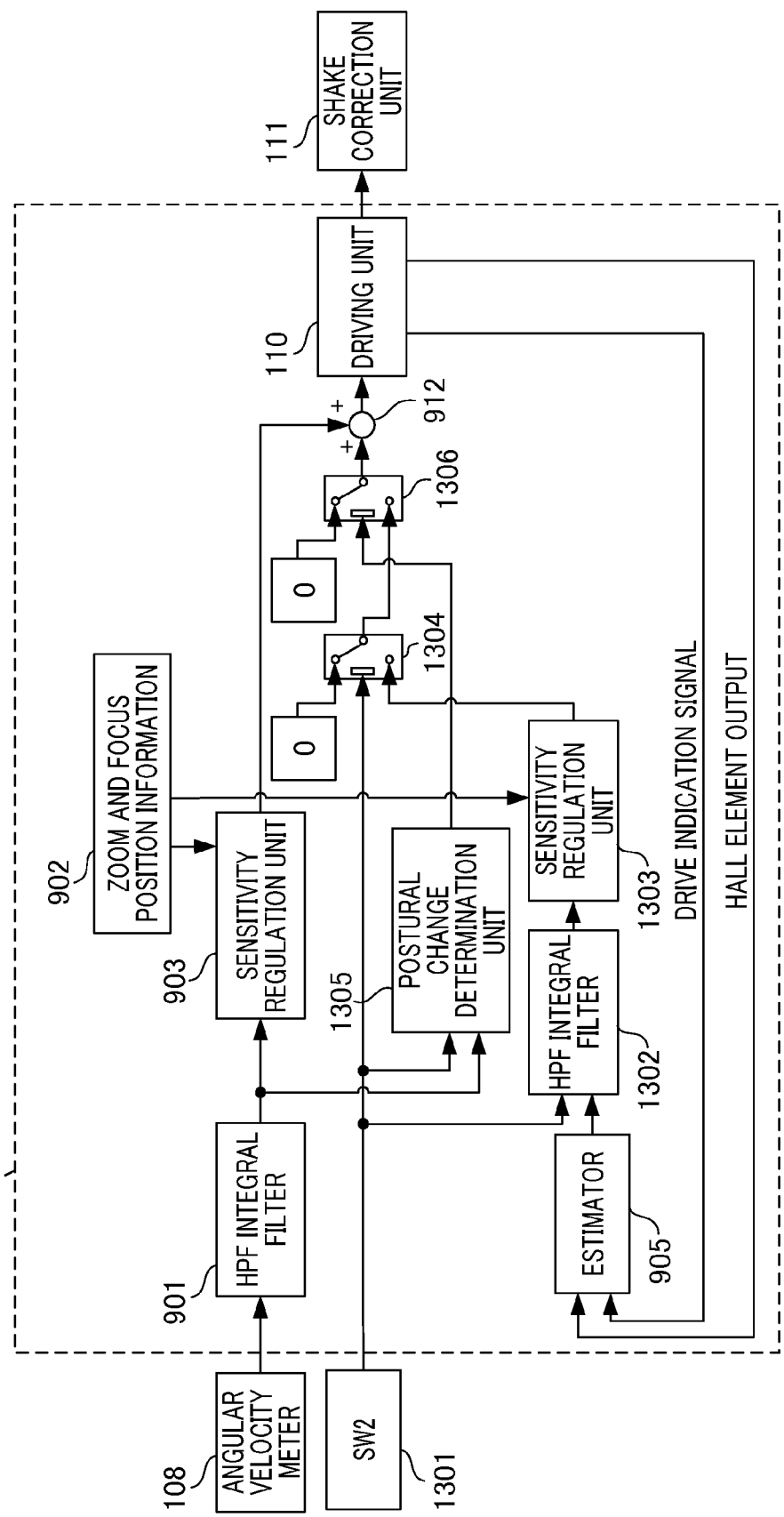
FIG. 10 is a block diagram showing a configuration example of a shake compensation apparatus according to a second embodiment of the present invention.

FIG. 10 shows a configuration example of a shake compensation apparatus according to the second embodiment. Furthermore, the detailed description of the components that are the same as those in the first embodiment is omitted by using the already used symbols, and the difference between the first embodiment and the second embodiment is mainly described. The same applies to the other embodiments described below.

In the second embodiment, translational shake compensation is performed based on a signal of the parallel displacement obtained by integrating the estimated parallel velocity calculated by the estimator 905. In addition, the ON/OFF of translational shake compensation is set depending on the state of the second switch SW2, and it is determined by a detection signal of the angular velocity meter 108 if a predetermined or greater postural attitude change has occurred just before the operation of the SW2, and the ON/OFF of translational shake compensation is set during the photographing operation.

Therefore, the differences between FIGS. 6 and 10 are as follows:

(1) the operational information 1301 of the SW2 is referenced;
(2) it does not have the HPF integral filter 909, the gain regulation unit 910, the output compensation unit 911, the HPF phase regulation unit 904, the angular velocity BPF unit 906, the parallel velocity BPF unit 907, the comparison unit 908 shown in FIG. 6; and that an HPF integral filter 1302 and a sensitivity regulation unit 1303 are provided for the calculation of translational shake compensation amount;
(3) a signal switching unit 1304 by the operational information 1301 of the SW2 is provided; and
(4) an attitude change determination unit 1305, and a signal switching unit 1306 by the output thereof are provided.

Since the rotational shake compensation is similar to that of the first embodiment, the translational shake compensation is described below.

The estimated parallel velocity from the estimator 905 is input to the HPF integral filter 1302. The HPF that constitutes the HPF integral filter 1302 cuts the DC component of an input signal, and this signal is converted into a parallel displacement signal by integration, and input to the sensitivity regulation unit 1303. The sensitivity regulation unit 1303 amplifies the output of the HPF integral filter 1302 to calculate the compensated target value of rotational shake based on the photographing magnification obtained from the zoom and focus position information 902.

The operational information 1301 of the SW2 in sent to the signal switching unit 1304. The signal switching unit 1304 selects zero or the output of the sensitivity regulation unit 1303, and outputs the result to the subsequent signal switching unit 1306, with reference to the operational information 1301. That is, if the SW2 is in the ON state, the output of the sensitivity regulation unit 1303 is selected, and the signal switching unit 1304 outputs a translational shake amount. In addition, if the SW2 is in the OFF state, the signal switching unit 1304 selects zero, and no translational shake compensation is made to be performed. The reason is that because the estimated parallel velocity by the estimator 905 may be significantly affected by the influence in gravity acceleration caused in association with the attitude change of an image capturing apparatus, mistaken estimations in parallel velocity unfavorably occur due to the influence in gravitational acceleration if the attitude change is great. In many cases, since a photographer does not perform great attitude change in the operation of the SW2, the appropriate calculation of a translational shake amount is possible in the ON state of the SW2, and the translational shake compensation is performed.

Although the attitude change determination unit 1305 determines the attitude change of an image capturing apparatus using an angular signal that is the output of the HPF integral filter 901, it calculates a change amount of the angular signal within the predetermined time at every control sampling. In addition, the operational information 1301 of the SW2 is also input to the attitude change determination unit 1305; while the SW2 is in the ON state, the attitude determination information is held just before the SW2 switches from the OFF to the ON state. This is to prevent the reduction in shake compensation control performance by the ON/OFF state of translational shake compensation switching while the SW2 is in the ON state, that is, in a photographing operation.

The signal switching unit 1306 selects and outputs zero or the output of the signal switching unit 1304 depending on the output of the attitude change determination unit 1305. That is, if the attitude change is determined by the attitude change determination unit 1305 to be a equal to or greater than a threshold when the SW2 is depressed, the signal switching unit 1306 selects zero in accordance with the output that indicates the determination result. In addition, if the attitude change is determined to be less than a threshold when the SW2 is depressed, the output of the signal switching unit 1304 is selected.

The operational information 1301 of the SW2 is also input to the HPF integral filter 1302, and the output of the HPF integral filter 1302 is initialized to zero due to the ON state of the SW2. This is to prevent a shake compensation amount input to the driving unit 110 from unfavorably changing stepwise just after the translational shake compensation has been performed; the translational shake compensation amount is initialized if the SW2 switches from the OFF to ON state.

FIG. 11 is a diagram illustrating the operation by the attitude change and the operation of the SW2 for translational shake compensation. The temporal change in the output 1401 of the sensitivity regulation unit 1303 and the temporal change in the output signals (translational shake compensation amounts) 1402, 1403 of the signal switching unit 1306 are shown. The signal 1402 shown in FIG. 11A indicates the change that is zero until the SW2 is depressed, and resembles the output 1401 after being depressed. Moreover, the signal 1403 shown in FIG. 11B indicates zero.

In the case of FIG. 11A, the translational shake compensation is performed since great attitude change does not occur when the SW2 is depressed. The SW2 is in the OFF state in photographing preparation, and the level of the signal 1402 indicates zero. The translational shake compensation amount is initialized to zero at the timing of the depression of the SW2, and an offset is calculated with the initial value being zero. The signal 1402 indicates a level obtained by subtracting the offset portion from the output 1401, and the translational shake compensation amount is calculated with this offset being subtracted until the photographing operation is complete. In contrast, the translational shake compensation is set so as not to be performed if a great attitude change is occurring when the SW2 is depressed, as in FIG. 11B. The level of the signal 1403 is set to zero when the SW2 is depressed, and the translational shake compensation amount is held to zero until the photographing operation is complete.

In the second embodiment, although the translational shake compensation can be performed only when the SW2 is depressed (in the operation of still image photography), this may be combined with the method of translational shake compensation in the first embodiment. That is, the above-described translational shake compensation is performed in the operation of still image photography by depressing SW2. In addition, the translational shake compensation using the rotation radius described in the first embodiment is performed in photographing preparation before the SW2 is depressed and in moving image photography. Thereby, appropriate translational shake compensation is possible depending on the situation.

According to the second embodiment, the ON/OFF setting can be switched for translational shake compensation, depending on the operational state of the SW2, that is, whether the release button 105 is in the fully depressed state or not. This enables the translational shake compensation with the influence of the gravitational acceleration in a photographing operation being eliminated. Therefore, the shake compensation performance in a still image photographing operation is enhanced since higher precise translational shake compensation can be performed compared to the translational shake compensation using the rotation radius described in the first embodiment.

[Third Embodiment]

Next, a third embodiment of the present invention is described.

The point on which the shake compensation apparatus according to the third embodiment differs from the shake compensation apparatus according to the sixth embodiment of the present invention is the configuration of the estimator. In the third embodiment, the output of the angular velocity meter 108 is input to an estimator 1501 together with a drive indication signal of the driving unit 110 and the output of a Hall element, as indicated by a dashed arrow in FIG. 6.

Figure 12:
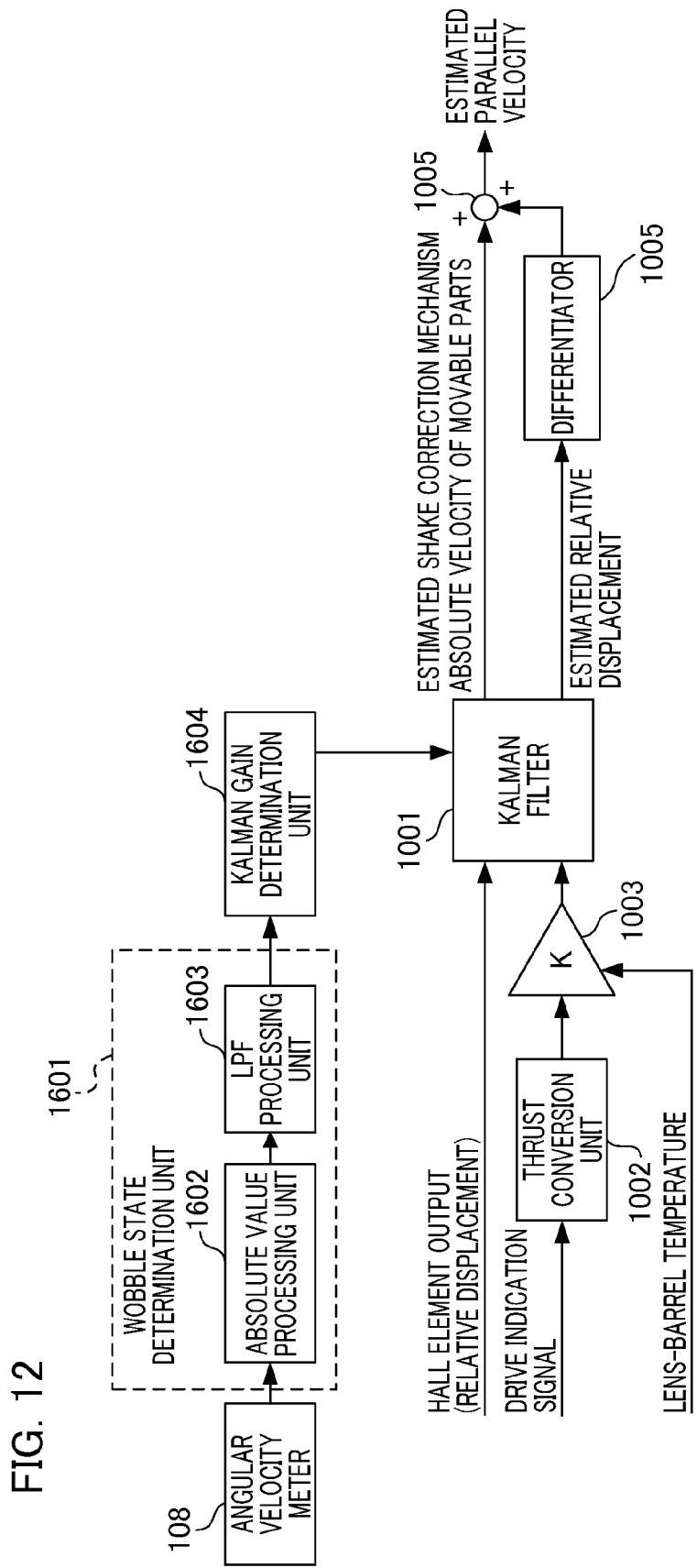
FIG. 12 is a block diagram showing a configuration example of the estimator of a shake compensation apparatus according to a third embodiment of the present invention.

FIG. 12 is a block diagram showing the internal process in the estimator 1501. The parallel velocity estimator in the third embodiment differs from the configuration example shown in FIG. 7 in the following respects:

(1) a wobble state determination unit 1601 is provided, which determines a wobble state such that the output of the angular velocity meter 108 serves as input; and (2) a Kalman gain determination unit 1604 in which the output of the wobble state determination unit 1601 serves as input is provided, which output is sent to the Kalman filter 1001, and a parallel velocity is estimated using the Kalman gain set in the Kalman gain determination unit 1604.

The calculation process of the estimated parallel velocity is described below.

The wobble state determination unit 1601 calculates a wobble state amount by obtaining the output of the angular velocity meter 108, and outputs the result to the Kalman gain determination unit 1604. In the wobble state determination unit 1601, a high-frequency component is cut by an LPF processing unit 1603 after the output of the angular velocity meter 108 has been converted into an absolute value by an absolute value processing unit 1602. An LPF-processed signal is calculated as a wobble state amount.

The process of a wobble state determination unit 1610 is described with reference to FIGS. 13A and 13B. FIG. 13A illustrates the temporal change in the output 1701 of the angular velocity meter 108, and in the output 1702 of the absolute value processing unit 1602. FIG. 13B illustrates the temporal change in the output 1703 of the LPF processing unit 1603.

The output 1701 of the angular velocity meter 108 shown in FIG. 13A is the absolute-value that has been converted in the absolute value processing unit 1602, the output 1702 is obtained, and further, a high-frequency component is cut in the LPF processing unit 1603. The cutoff frequency of an LPF that constitutes the LPF processing unit 1603 is, for example, set to a frequency of 0.5 Hz or less, and the output 1703 shown in FIG. 13B is obtained. Furthermore, the LPF processing unit 1603 may be a configuration in which a moving average is calculated over a predetermined period.

Among the periods TA to TD shown in FIG. 13B, the period TB shows a state in which a hand tremble is very great. In this case, the output of the LPF processing unit 1603 is output so that it remains at a great value. Moreover, the period TD shows a state in which a hand tremble is very small. In this case, the output of the LPF processing unit 1603 is output so that it remains at a small value.

The output of the LPF processing unit 1603, that is, the output of the wobble state determination unit 1601, is input to the Kalman gain determination unit 1604. The Kalman gain determination unit 1604 selects the Kalman gain set in conformity to the wobble state, and sets parameters of the Kalman filter 1001. In the Kalman gain determination unit 1604, the determination thresholds of the wobble state have been previously set like Th3, Th2, Th1 shown in FIG. 13B. By comparing the output value of the LPF processing unit 1603 with these determination thresholds, the Kalman gain is set depending on the comparison result that indicates within which range it is. That is, in this example, the values of Kalman gain are stored in a memory for the ranges greater than Th3, between Th3 and Th2, between Th2 and Th1, and less than Th1, respectively.

So that appropriate parallel velocity can be estimated depending on the wobble state, the Kalman gain depending on the wobble state amount has been previously obtained. By predicting the disturbance in advance depending on the wobble state amount obtained from angular velocity, the Kalman gain can be previously set. In this example, the determination of the wobble state is performed with angular velocity. For example, this wobble state determination does not lead to an appropriate value for translational shake estimation if the angular velocity is very great and the parallel velocity is very small, and if the angular velocity is very small and the parallel velocity is very great. However, in the case of ordinary hand-held photography, there is seldom a situation in which rotational shake is very small and translational shake is very great, and the wobble state amount obtained by the angular velocity is correlated with the disturbance. Therefore, by altering the Kalman gain that has been previously set depending on the wobble state amount obtained from the angular velocity, an appropriate estimated parallel velocity is obtained depending on the wobble situation, and the shake compensation performance by translational shake compensation is enhanced.

[Fourth Embodiment]

Next, a fourth embodiment of the present invention is described.

Figure 14:
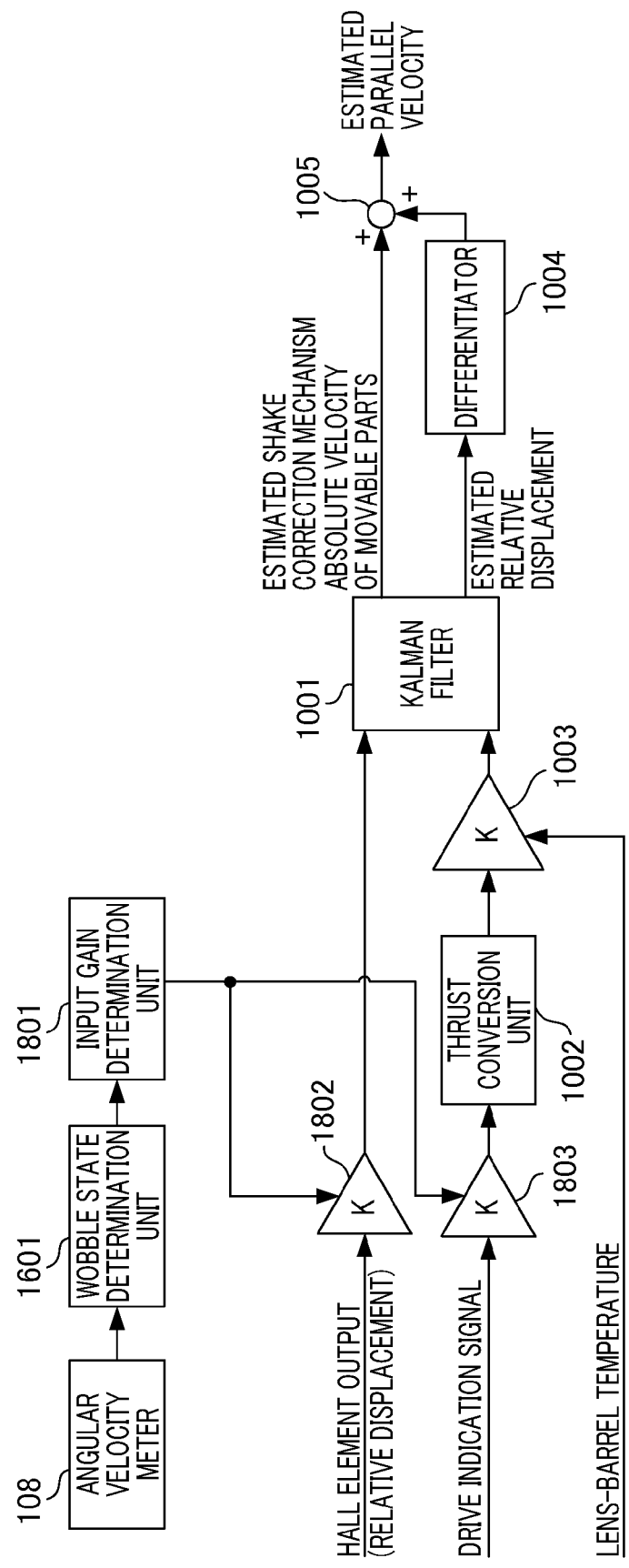
FIG. 14 is a block diagram showing a configuration example of the estimator of a shake compensation apparatus according to a fourth embodiment of the present invention.

FIG. 14 is a block diagram showing a configuration example of the estimator 1501 of the shake compensation apparatus according to the fourth embodiment. The differences between FIGS. 12 and 14 are as follows:

(1) instead of the Kalman gain determination unit 1604, an input gain determination unit 1801 is provided to control input variable gain units 1802, 1803; and (2) the input variable gain units 1802 and 1803 amplify the output (relative displacement) of a Hall element and a drive indication signal, respectively.

In the fourth embodiment, the output of the wobble state determination unit 1601 is input in the input gain determination unit 1801. The input variable gain unit 1802 amplifies the output (relative displacement) of a Hall element and outputs the result to the Kalman filter 1001, in accordance with the output of the input gain determination unit 1801. In addition, the input variable gain unit 1803 amplifies a drive indication signal and outputs the result to the thrust conversion unit 1002, in accordance with the output of the input gain determination unit 1801. Thereby, the estimated parallel velocity calculated by the Kalman filter 1001 is great if the output of the wobble state determination unit 1601 is great, and the estimated parallel velocity calculated by the Kalman filter 1001 is small if the output of the wobble state determination unit 1601 is small.

So that appropriate parallel velocity can be estimated depending on the wobble state, the gain of an input signal to the Kalman filter 1001 depending on the wobble state amount has been previously obtained, and the input gain determination unit 1801 holds the gain value. Although the estimated value from the Kalman filter 1001 may be directly used if the wobble is very great, the gain is set so that the estimated value from the Kalman filter 1001 is small if the wobble is very small. This is why the concern about mistaken estimation occurs in the case in which, when wobble is small, the estimation precision of the estimated value of the parallel velocity from the Kalman filter is low. That is, if the estimated parallel velocity is set at a large value even though the actual parallel velocity is small, the shake compensation performance is unfavorably reduced due to the over-compensation in translational shake compensation. The above-described gain setting is performed in order to prevent this. In the case of ordinary hand-held photography, since there are a few situations in which rotational shake is very small and translational shake is very great, the translational shake compensation amount is restricted so that it is not too great if the rotational shake is very small.

According to the fourth embodiment, by altering the gain of an input signal to the Kalman filter 1001 that has been previously set depending on the wobble state amount obtained from an angular velocity detection signal, the reduction in shake compensation performance in translational shake compensation due to a mistaken estimation of parallel velocity can be prevented.

[Fifth Embodiment]

Next, a fifth embodiment of the present invention is described.

Figure 15:
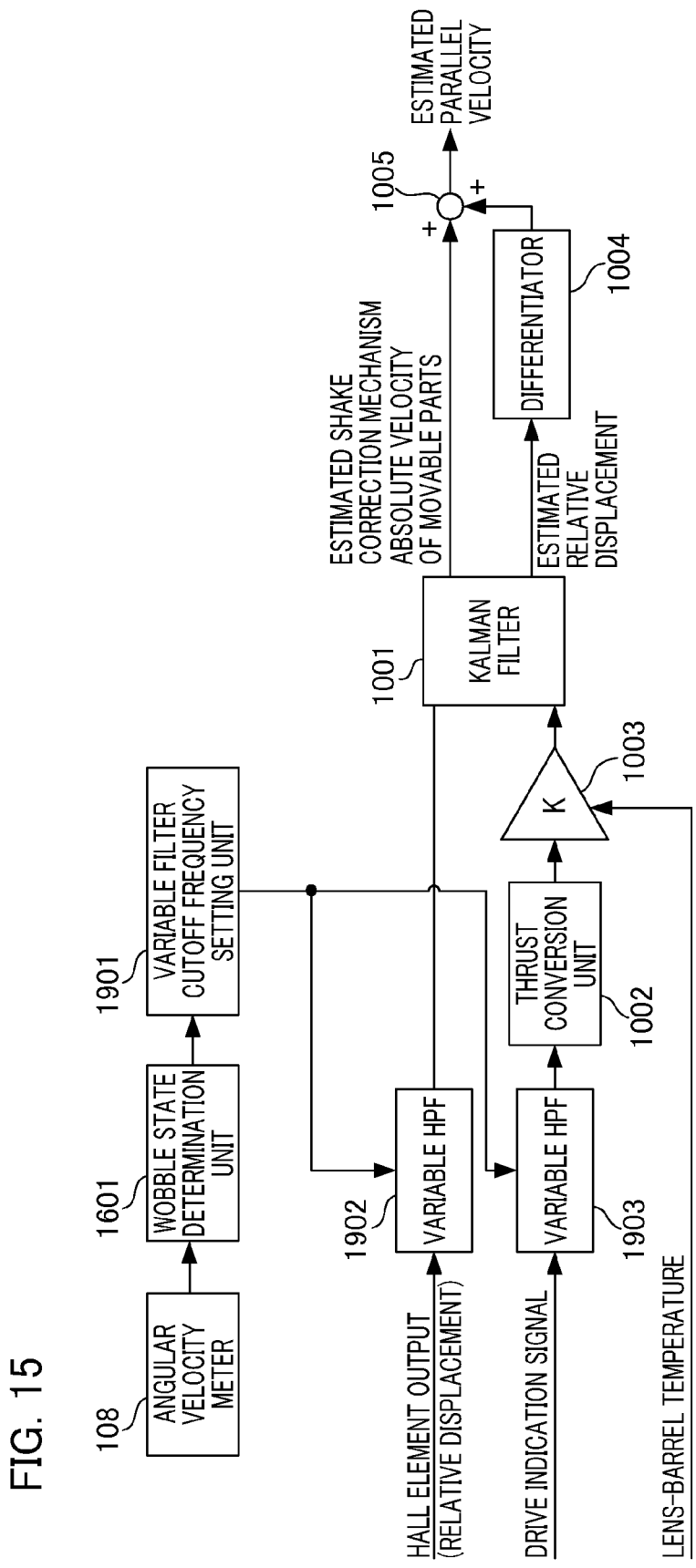
FIG. 15 is a block diagram showing a configuration example of the estimator of a shake compensation apparatus according to a fifth embodiment of the present invention.

FIG. 15 is a block diagram showing a configuration example of the estimator 1501 of the shake compensation apparatus according to the fifth embodiment. The differences between FIGS. 12 and 15 are as follows:

(1) instead of the Kalman gain determination unit 1604, a variable filter cutoff frequency setting unit 1901 is provided to control variable HPFs 1902 and 1903; and (2) the variable HPFs 1902 and 1903 output HPF-processed signals to the output (relative displacement) of a Hall element and a drive indication signal, respectively.

In the fifth embodiment, the output of the wobble state determination unit 1601 is input to the variable filter cutoff frequency setting unit (hereinafter referred to as "cutoff setting unit") 1901, the output of which is sent to the variable HPF 1902 and the variable HPF 1903, respectively. The variable HPF 1902 that processes the output (relative displacement) of a Hall element has the cutoff frequency altered depending on the output of the cutoff setting unit 1901, and outputs a filter-processed signal to the Kalman filter 1001. In addition, the variable HPF 1903 that processes a drive indication signal has the cutoff frequency altered depending on the output of the cutoff setting unit 1901, and outputs a filter-processed signal to the thrust conversion unit 1002. In accordance with the setting of the cutoff frequency depending on the wobble state amount in the cutoff setting unit 1901, the estimated parallel velocity calculated by the Kalman filter 1001 is calculated without the low-pass gain being cut if the output of the wobble state determination unit 1601 is great. In addition, the estimated parallel velocity is calculated with the low-pass gain being made smaller if the output of the wobble state determination unit 1601 is small.

So that appropriate parallel velocity can be estimated depending on the wobble state, the cutoff frequency of each variable HPF to the output (relative displacement) of a Hall element and a drive indication signal have been previously set depending on the wobble state amount. Thereby, appropriate parallel velocity estimation is possible depending on the wobble state amount. If the wobble state amount is equal to or greater than threshold, the cutoff frequency of a variable HPF is set to a lower degree, and the estimated value by the Kalman filter 1001 may be directly used. However, if the wobble state amount is less than a threshold, the low-pass gain of the estimated value of the Kalman filter 1001 is designed to be small by setting the cutoff frequency of a variable HPF so as to be large. This is why the concern about mistaken estimation occurs when a wobble is small in the case in which the estimation precision of the parallel velocity of the Kalman filter 1001 is low. That is, if the estimated parallel velocity is calculated at a large value even though the actual parallel velocity is small, the shake compensation performance is unfavorably reduced due to the over-compensation of translational shake compensation. Therefore, the over-compensation can be prevented by the above-described setting of the cutoff frequency of a variable HPF. In the case of ordinary hand-held photography, since there are a few situations in which rotational shake is very small and translational shake is very great, the filter setting is performed so as to prevent miscalculation for the low-pass characteristics of the estimated value of translational shake compensation if the rotational shake is very small.

According to the fifth embodiment, by altering the cufoff frequency of a variable HPF that processes an input signal to the Kalman filter 1001 depending on the wobble state amount obtained from an angular velocity, the mistaken estimation of parallel velocity can be prevented, and the shake compensation performance in translational shake compensation can be enhanced.

[Sixth Embodiment]

Next, a sixth embodiment of the present invention is described.

Figure 16:
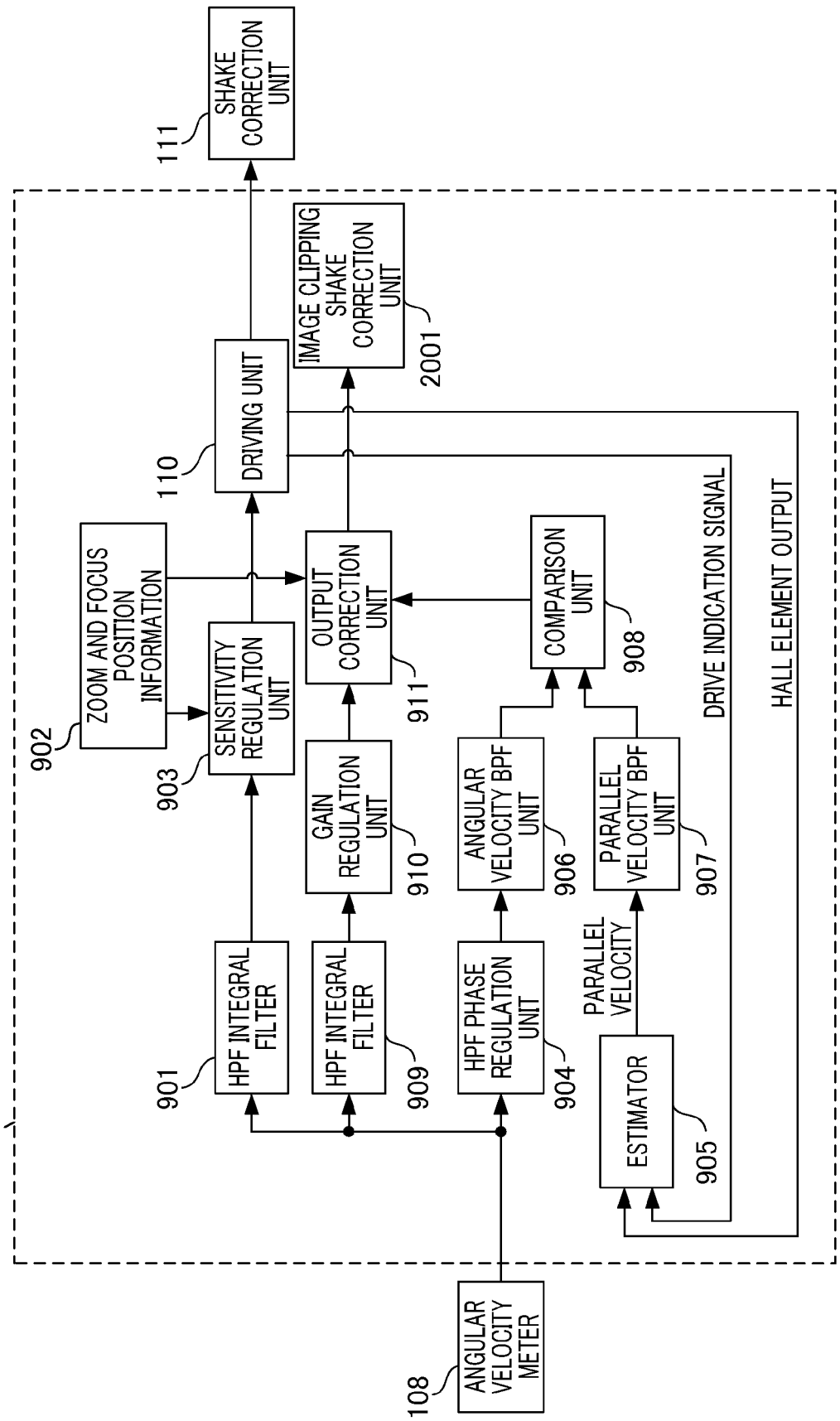
FIG. 16 is a block diagram showing a configuration example of a shake compensation apparatus according to a sixth embodiment of the present invention.

FIG. 16 shows a configuration example of the shake compensation apparatus according to the sixth embodiment.

In the sixth embodiment, the rotational shake compensation and the translational shake compensation are not performed in the driving unit 110 and the shake compensation unit 111 as in the first embodiment, but the rotational shake compensation and the translational shake compensation are separately performed. That is, the rotational shake compensation is performed by the driving unit 110 and the shake compensation unit 111, and the translational shake compensation is performed by an image clipping shake compensation unit 2001. The image clipping shake compensation unit 2001 performs a shake compensation process by shifting an output area within a photographic image generated from the output of the imaging element 107 in accordance with the translational shake compensation amount output by the output compensation unit 911.

The difference between FIGS. 6 and 16 is as follows:

(1) there is no addition unit 912 shown in FIG. 6 in FIG. 16, and the output of the sensitivity regulation unit 903 is input to the driving unit 110; and (2) the output of the output compensation unit 911 is input to the image clipping shake compensation unit 2001.

Figure 17:
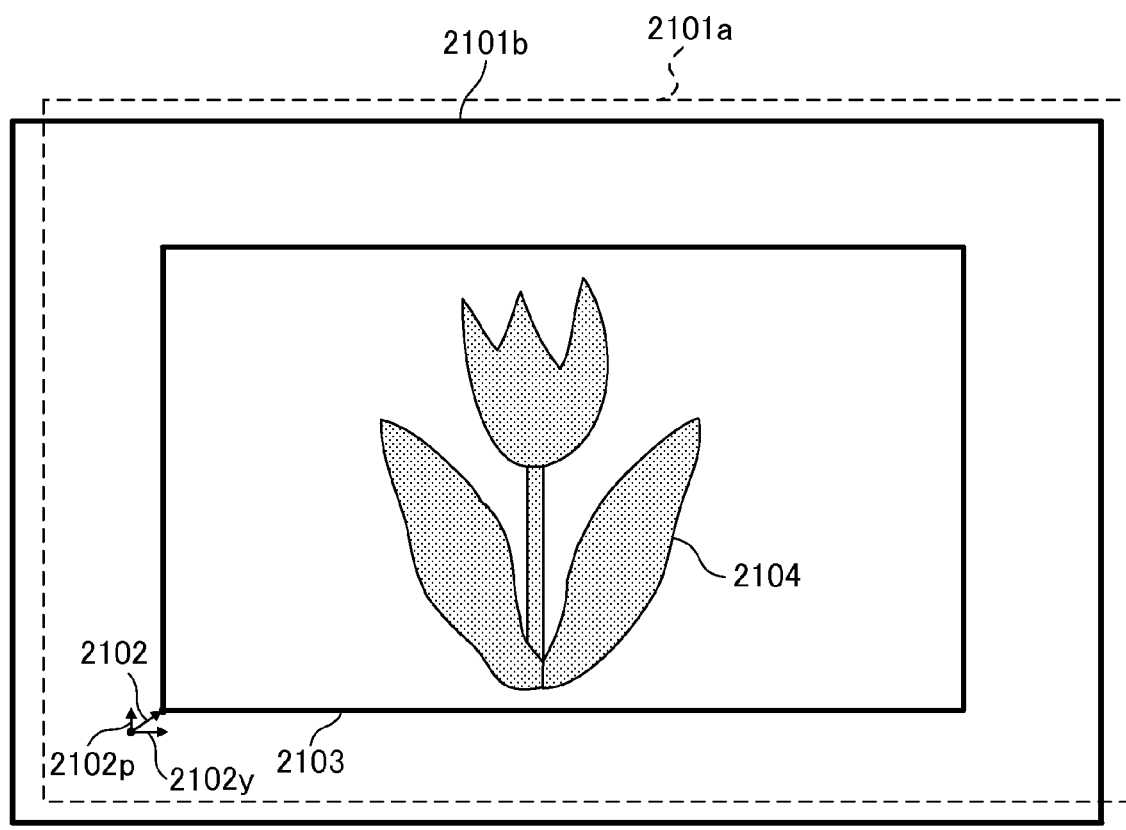
FIG. 17 is a diagram for illustrating shake compensation control according to a sixth embodiment of the present invention.

FIG. 17 is a diagram illustrating how a shake compensation process is performed by shifting an output area within a photographic image generated using the output of the imaging element 107 by a process of the image clipping shake compensation unit 2001.

FIG. 17 shows an output image 2101a of the imaging element 107 photographed at a time t1, and an output image 2101b of the imaging element 107 photographed at a time t2 after the predetermined time has passed (for example, after ⅟30 second). If a shake compensation means that compensates image shake by offsetting a photographic optical axis is not provided, these two images differ from each other in composition by rotational shake and translational shake. In the configuration in FIG. 16, since the rotational shake compensation is performed in the driving unit 110 and the shake compensation unit 111 and the rotational shake is compensated, the compositions will differ from each other due to the remaining translational shake.

The output compensation unit 911 outputs the translational shake compensation amount in each of the horizontal and vertical directions to the image clipping shake compensation unit 2001. The image clipping shake compensation unit 2001 calculates the movement amount (see arrows 2102$y$, 2102$p$) of the image clipping in each of the horizontal and vertical directions for every photographic frame, and moves (shifts) the image clipping position by the movement amount (see the arrows 2102) of the image clipping. That is, the arrows 2102 represent the movement amount corresponding to translational shake and the vector in a compensation direction. This makes the image clipping range at the photographing time t1 of the image 2101$a$ the range shown in an image 2013. It also makes the image clipping range in the image 2101$b$ at the photographing time t2 the range shown in the image 2013, and moving image photography can be performed on a flower (see an image 2104) that is the main photographic subject without image shake. By performing translational shake compensation by image clipping for every photographic frame, translational shake compensation can be concurrently performed with rotational shake compensation in moving image photography.

In the sixth embodiment, for rotational shake compensation, a shake compensation means is used that compensates image shake by offsetting a photographic optical axis. Moreover, for translational shake compensation, an image clipping shake compensation means is used that performs a shake compensation process by altering an output area of a photographic image. Thereby, the drive range for rotational shake compensation and the drive range for translational shake compensation can be ensured, respectively. Therefore, since the drive range of image shake compensation can be enlarged, the abrupt reduction in shake compensation control performance can be prevented in the vicinity of a control edge due to the an insufficiency in shake compensation control range.

[Seventh Embodiment]

Next, a seventh embodiment of the present invention is described.

Figure 18:
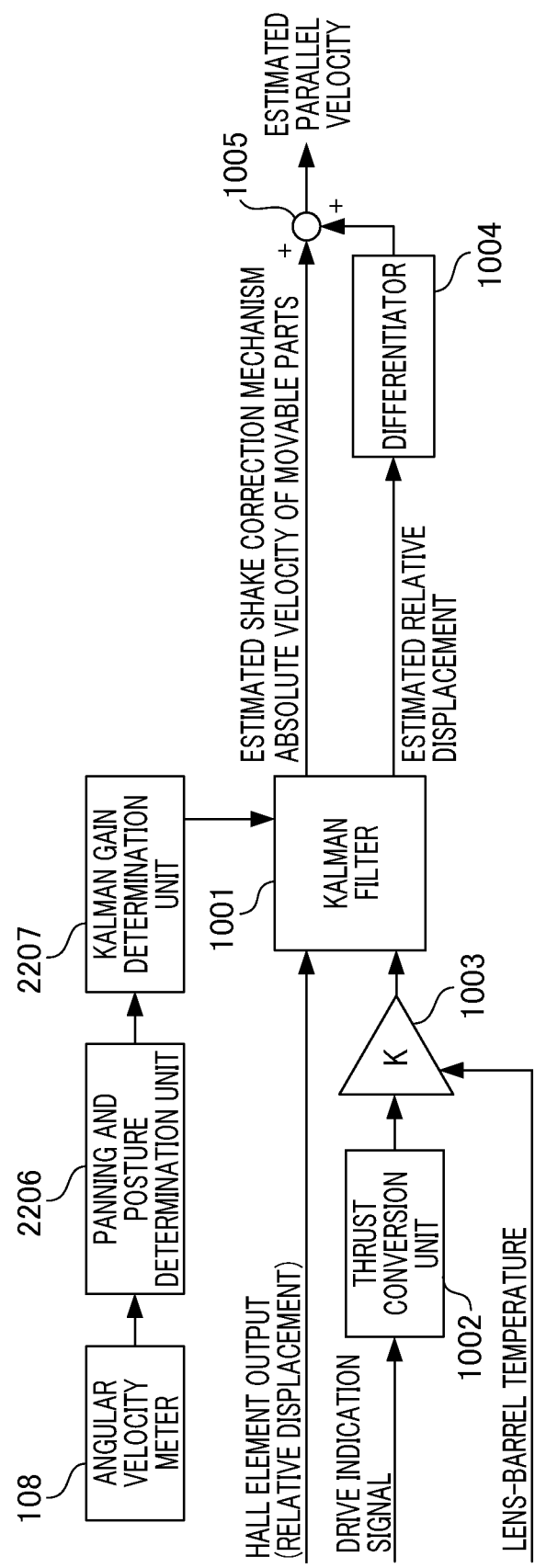
FIG. 18 is a block diagram showing a configuration example of an estimator in FIG. 6.

FIG. 18 is a control block diagram showing a configuration example of the estimator 905. The parallel velocity estimator in the seventh embodiment differs from a configuration example shown in FIG. 7 in the following respects:

(1) a panning and attitude determination unit 2206 is provided that determines panning and attitude change such that the output of the angular velocity meter 108 serves as the input; and (2) a Kalman gain determination unit 2207 is provided in which the output of the panning and attitude determination unit 2206 serves as input, the output of which is sent to the Kalman filter 1001, and the parallel velocity is estimated using the Kalman gain set in the Kalman gain determination unit 2207.

A calculation process of estimated parallel velocity is described below.

The output of the angular velocity meter 108 is input to the panning and attitude determination unit 2206, and the determination result of panning and attitude change, that is, the comparison result of the attitude change amount and a threshold is input to the Kalman gain determination unit 2207. Thereby, the Kalman gain is set depending on the determination result of the panning and attitude determination unit 2206, and the estimated parallel velocity changes.

A process until the parallel velocity has been estimated based on the panning determination result in the panning and attitude determination unit 2206 is described below using FIGS. 19A and 19B.

Figure 19A:
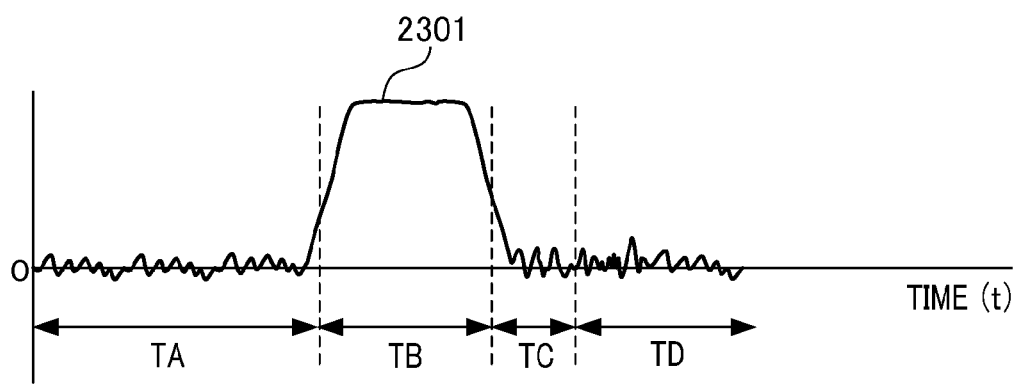
FIGS. 19A and 19B are diagrams illustrating panning determination and parallel velocity estimation.
Figure 19B:
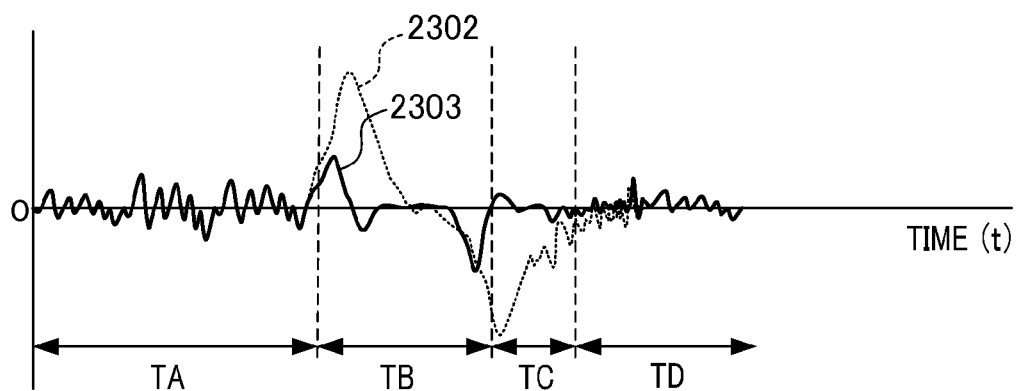

FIG. 19A shows the temporal change in the output 2301 of the angular velocity meter 108. FIG. 19B shows the temporal change in estimated parallel velocities 2302, 2303. The estimated parallel velocity 2302 is the parallel velocity estimated by the Kalman filter 1001 if the Kalman gain is altered by the Kalman gain determination unit 2207. The estimated parallel velocity 2303 is the parallel velocity estimated from the Kalman filter 1001 if the Kalman gain is not altered by the Kalman gain determination unit 2207. The periods TA and TD in FIG. 8 are the period during which a user is in an ordinary hand-held state without performing panning. In this case, since the attitude change amount is less than a threshold, the panning and attitude determination unit 2206 outputs a determination signal that indicates "panning non-operation". Moreover, the period TB is a period during a panning operation, and the panning and attitude determination unit 2206 outputs a determination signal that indicates "performing a panning operation". The period TC is a period just immediately before and immediately after a panning operation ends, and the panning and attitude determination unit 2206 outputs a determination signal that indicates "ending panning operation".

The panning and attitude determination unit 2206 determines that the apparatus is performing a panning operation and undergoing an attitude change if the detected angular velocity continues to be equal to or greater than a threshold for a predetermined time or more. The attitude change before and after the time that the panning operation ends will also be included in the latter attitude change. Or, it may determine that the apparatus is performing a panning operation and undergoing an attitude change if the angular acceleration that is a first-order differential of the detected angular velocity continues to be equal to or greater than a threshold for a predetermined time or more. Or, it may determine that the apparatus is performing a panning operation and undergoing an attitude change, based on the fact that the detected angular velocity continues to be equal to or greater than a threshold or more for the predetermined time or more, and the angular acceleration continues to be equal to or greater than a threshold for a predetermined time or more.

In the periods TB and TC, the Kalman gain has been previously obtained so that the estimated parallel velocity that is a calculation result is small. Particularly, it is necessary to prevent the mistaken estimation of parallel velocity in the periods TC and TD. The Kalman gain that conforms to the magnitude of ordinary hand tremble is set to panning non-operation in the period TA and TD.

The control by which the estimated parallel velocity is intentionally made smaller is performed by gain alteration, under a condition in which the parallel velocity becomes very greater by the change in gravitational acceleration in association with the attitude change of the apparatus and the external disturbance acceleration during the panning operation. Thereby, the over-compensation of shake compensation according to translational shake compensation can be prevented during and immediately before and immediately after a panning operation and an attitude change.

Figure 20A:
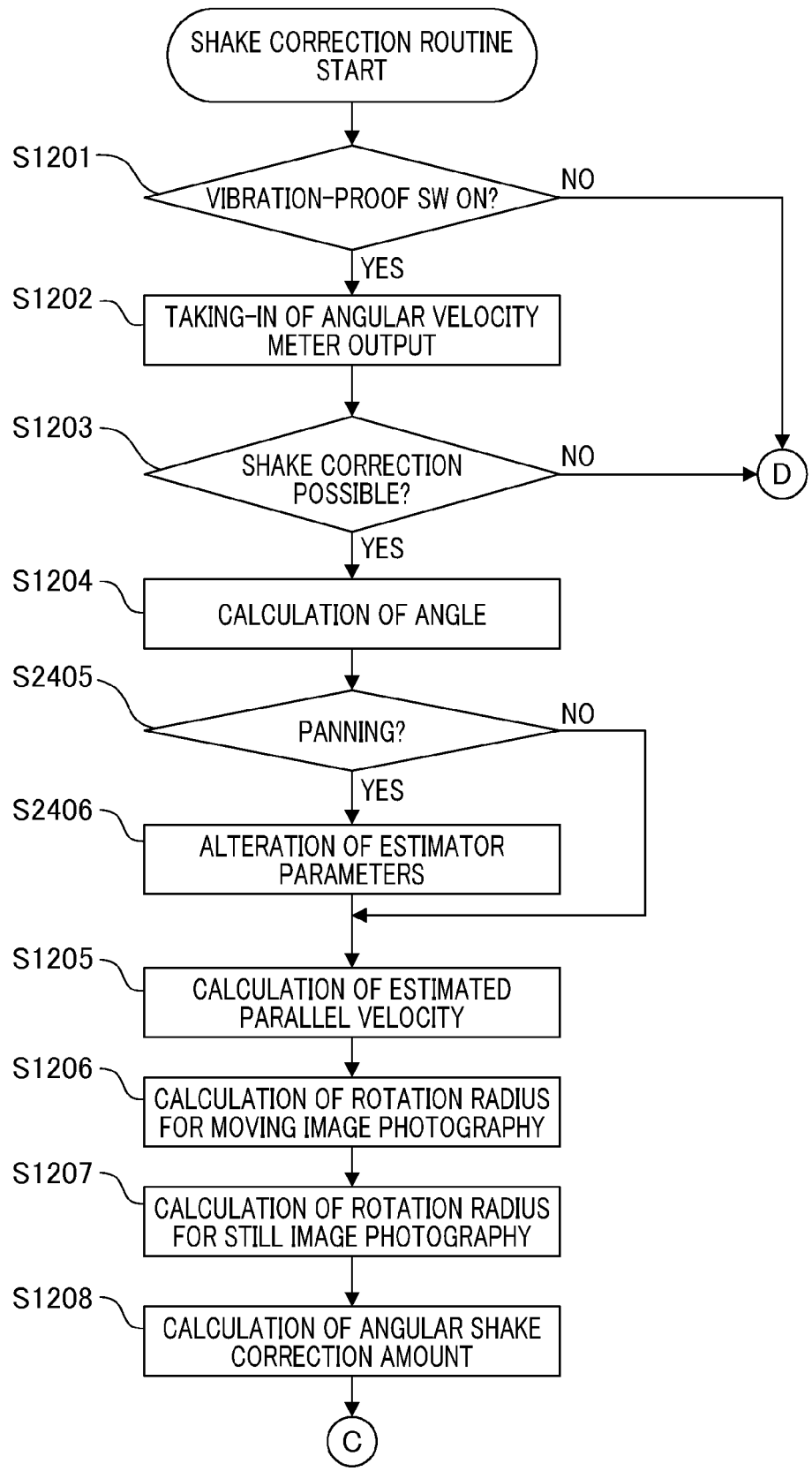
FIGS. 20A and 20B are flow charts illustrating an operation example of a shake compensation apparatus according to a seventh embodiment of the present invention.
Figure 20B:
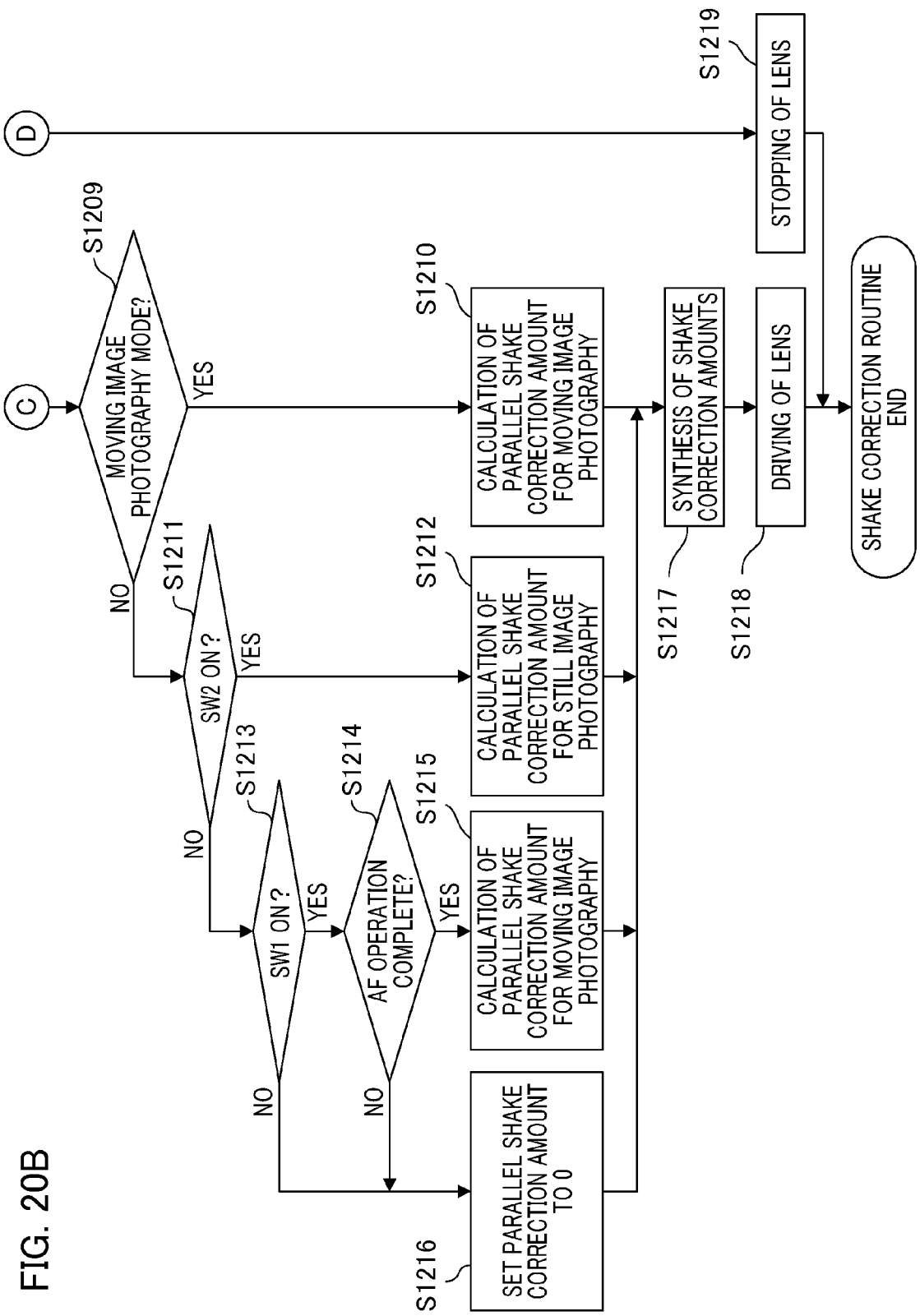

Next, the overall operation of the shake compensation control according to the seventh embodiment is explained with reference to FIGS. 20A and 20B. The flow charts shown in FIGS. 20A and 20B start with the ON operation of the main power source of an image capturing apparatus, and is executed each fixed sampling period in accordance with a program interpreted and executed by the CPU 106.

The seventh embodiment differs from the first embodiment in the following respect.

S2405 following S1204 is a panning determination process performed by the panning and attitude determination unit 2206, and proceeds to S1307 if it is determined not to be performing a panning operation, and proceeds to S2406 if it is determined to be performing a panning operation. In S2406, the parameters of the estimator 905 are altered as described in FIGS. 19A and 19B, and the process proceeds to S1205. The above-described preceding and following processes (S1201-S1204 and S1205-S1219) are similar to those in the first embodiment.

As described above, in the seventh embodiment, parallel velocity can be calculated, and translational shake compensation can be performed. It is assumed that a photographer performs a photographing operation depending on the timing while framing by following a photographic subject, or that the photographer performs a photographing operation while regulating angle-of-view shake caused by a hand tremble, and the like. In this case, if there is also the influence of translational shake in relation to hand tremble that is not intended by the photographer, the influence of translational shake is great due to the photographer intentionally shaking a camera. If the translational shake compensation using the rotation radius according to the compensation of rotational shake is performed, the rotation radius in a panning operation is a very great value, and it is possible to err in the estimation of the rotation radius in photography just after a panning operation. That is, if the translational shake compensation amount has become excessive in photography immediately after the operation of panning and an attitude change, it unfavorably affects the shake compensation effect of shake compensation. Therefore, in this embodiment, by altering the Kalman gain that has been previously set depending on the panning and attitude determination result, over-estimation of the parallel velocity during a panning operation and while undergoing an attitude change can be prevented. Moreover, in a panning operation, translational shake will become great due to a photographer intentionally shaking an image capturing apparatus and changing the attitude of the apparatus in a certain direction. In this case, since there is no need to perform translational shake compensation, the control by which the estimated parallel velocity is intentionally made smaller is performed so that the translational shake compensation amount in a panning operation is small.

According to the seventh embodiment, the shake compensation performance in translational shake compensation improves by preventing the reduction in shake compensation performance due to the over-compensation of translational shake during and immediately after panning and attitude change.

[Eighth Embodiment]

Next, an eighth embodiment of the present invention is described.

Figure 21:
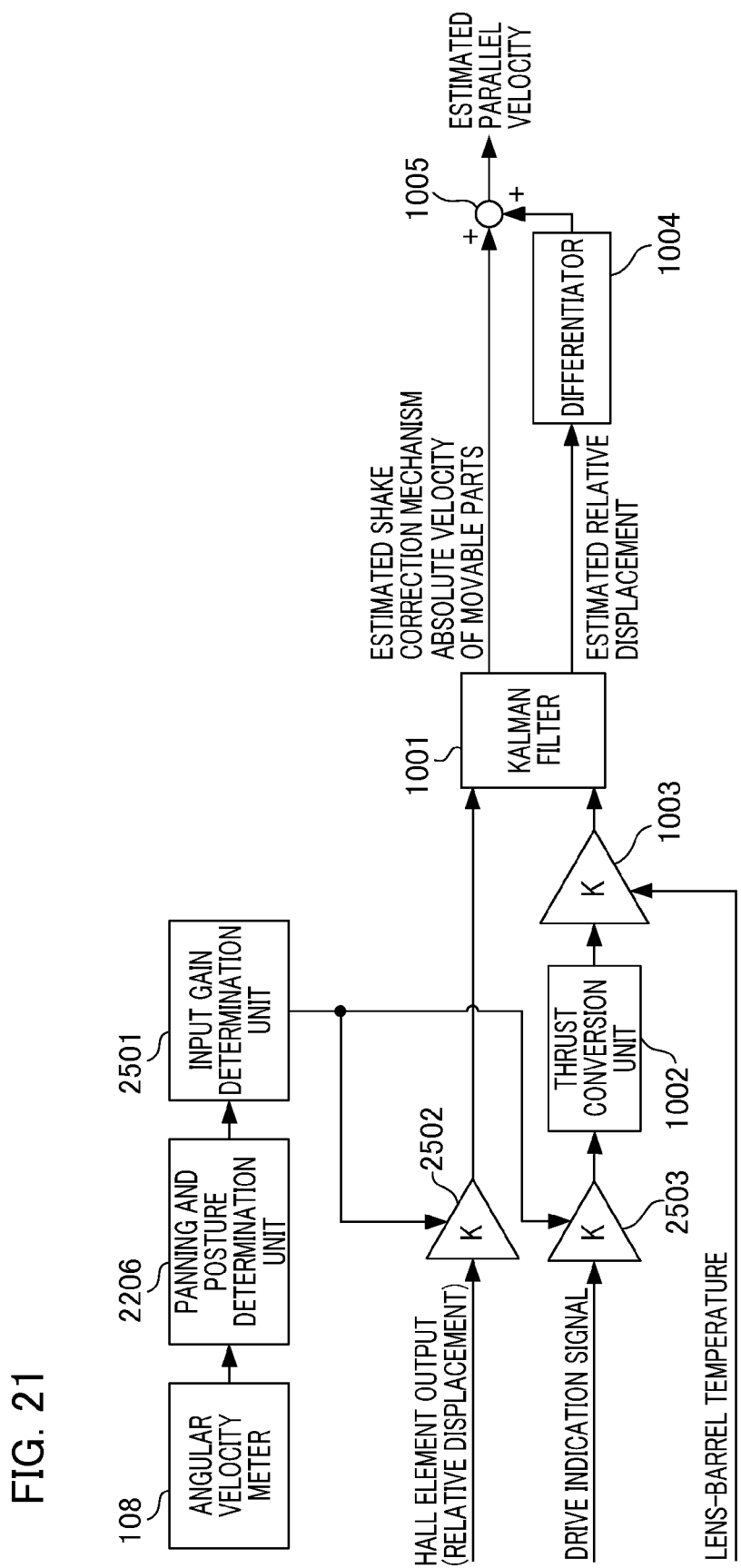
FIG. 21 is a block diagram showing a configuration example of the estimator of a shake compensation apparatus according to an eighth embodiment of the present invention.

FIG. 21 is a block diagram showing a configuration example of the estimator 905 of the shake compensation apparatus according to the eighth embodiment. The differences between the configurations shown in FIGS. 18 and 21 are as follows:

(1) instead of the Kalman gain determination unit 2207, an input gain determination unit 2501 and input variable gain units 2502 and 2503 are provided; and (2) the input variable gain units 2502 and 2503 amplify the output (relative displacement) of a Hall element and a drive indication signal, respectively.

In the eighth embodiment, the output of the panning and attitude determination unit 2206 is input to the input gain determination unit 2501. The output of the input gain determination unit 2501 is sent to each of the input variable gain units 2502, 2503. The input variable gain unit 2502 amplifies the output (relative displacement) of a Hall element and outputs the result to the Kalman filter 1001 in accordance with the output of the input gain determination unit 2501. Moreover, the input variable gain unit 2503 amplifies a drive indication signal and outputs the result to the thrust conversion unit 1002 in accordance with the output of the input gain determination unit 2501.

Thereby, the estimated parallel velocity of the Kalman filter 1001 is small if the apparatus is determined to be performing a panning operation and undergoing an attitude change by the panning and attitude determination unit 2206. That is, if the panning state and the attitude change of the apparatus occur, the gain of the input variable gain unit 2502 or 2503 is set by the output of the input gain determination unit 2501 so that the estimated parallel velocity is small compared to the case in which the apparatus is determined not performing a panning operation. In addition, if the apparatus is determined not to be performing a panning operation and undergoing an attitude change by the panning and attitude determination unit 2206, the input gain determination unit 2501 controls the input variable gain unit 2502 or 2503, and the gain in conformity to the magnitude of an ordinary hand tremble is set.

Each gain of the input variable gain units 2502 and 2503 is set for intentionally making the estimated parallel velocity smaller under a condition in which the parallel velocity becomes very great due to the influence of gravitational acceleration in association with the attitude change of the apparatus and the influence of disturbance acceleration due to a panning operation.

According to the eighth embodiment, the shake compensation performance in translational shake compensation improves by preventing the reduction in shake compensation performance due to the over-compensation in translational shake compensation during and immediately after panning and attitude change.

[Ninth Embodiment]

Next, a ninth embodiment of the present invention is described.

Figure 22:
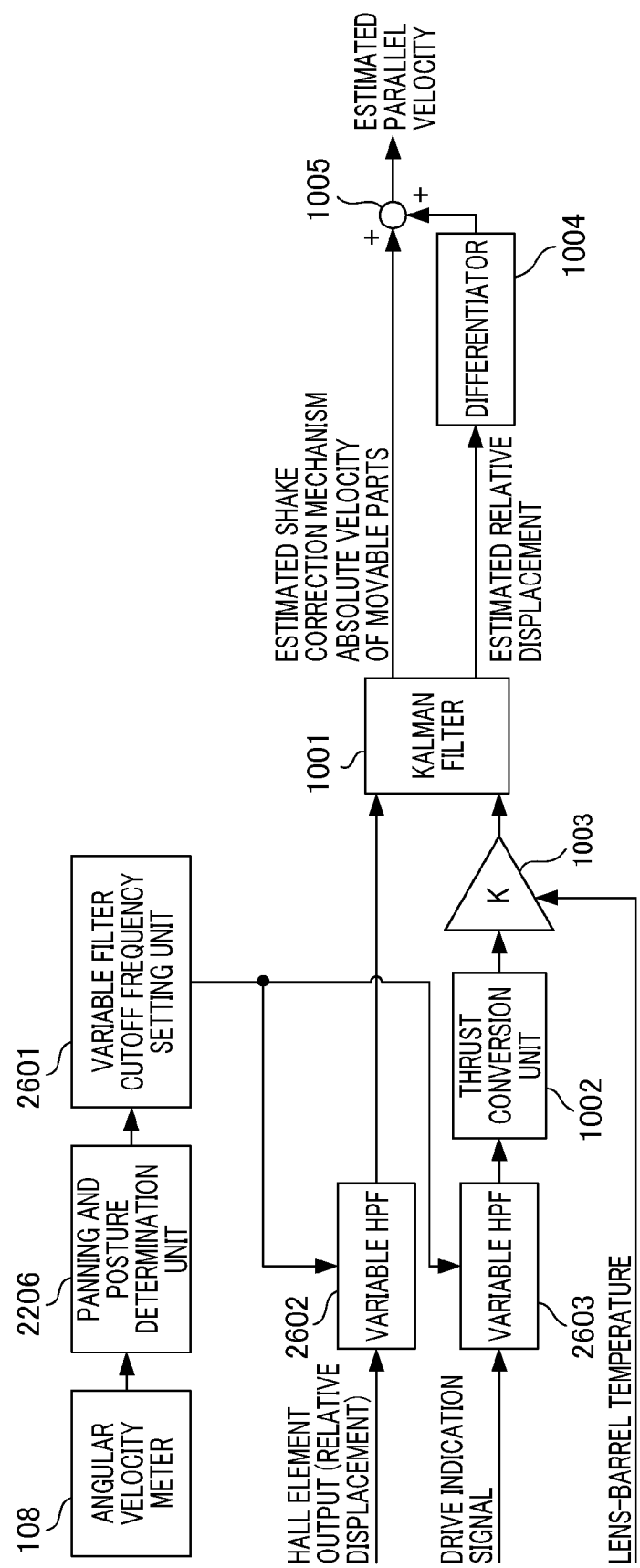
FIG. 22 is a block diagram showing a configuration example of the estimator of a shake compensation apparatus according to a ninth embodiment of the present invention.

FIG. 22 is a block diagram showing a configuration example of the estimator 905 of the shake compensation apparatus according to the ninth embodiment. The differences between the configurations shown in FIGS. 18 and 22 are as follows:

(1) instead of the Kalman gain determination unit 2207, a variable filter cutoff frequency setting unit 2601 and variable HPFs 2602 and 2603 are provided; and (2) the variable HPFs 2602 and 2603 output an HPF-processed signal to each of the output (relative displacement) of a Hall element and a drive indication signal.

In the ninth embodiment, the output of the panning and attitude determination unit 2206 is input to the variable filter cutoff frequency setting unit (hereinafter referred to as "cutoff setting unit") 2601. The output of the cutoff setting unit 2601 is input to the variable HPFs 2602 and 2603, and the cutoff frequency of an HPF process is altered with respect to each of the output (relative displacement) of a Hall element and a drive indication signal. Thereby, the cutoff frequency of an HPF is set to a high frequency if the panning and attitude determination unit 2206 determines that the apparatus is performing a panning operation and undergoing attitude change. That is, the gain that is equal to or less than an HPF cutoff frequency is set to a smaller degree for the estimated parallel velocity calculated by the Kalman filter 1001. In addition, if the apparatus is determined not to be performing a panning operation and undergoing an attitude change by the panning and attitude determination unit 2206, the cutoff frequency of an HPF is set to a lower degree, and is set to gain characteristics in conformity to the magnitude of an ordinary hand tremble.

The cutoff frequencies of the variable HPFs 2602 and 2603 are set for intentionally making the estimated parallel velocity smaller under a condition in which the parallel velocity becomes very great due the influence in gravitational acceleration in association with the attitude change of the apparatus and the influence of the disturbance acceleration due to a panning operation.

According to the ninth embodiment, the shake compensation performance in translational shake compensation improves by preventing the reduction in shake compensation performance due to the over-compensation in translational shake compensation in and just after panning and attitude change.

[Tenth Embodiment]

Next, a tenth embodiment of the present invention is described.

Figure 23:
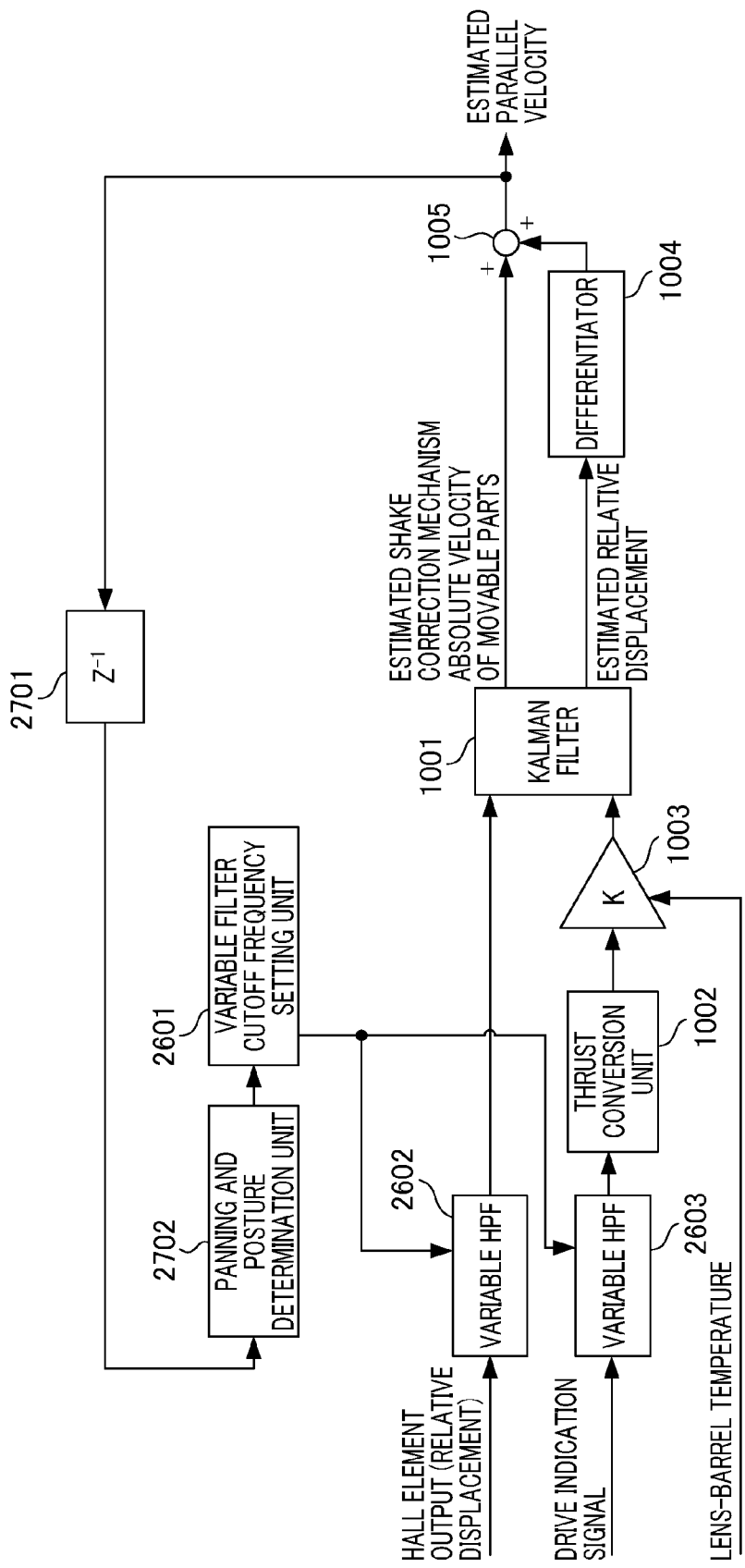
FIG. 23 is a block diagram showing a configuration example of an estimator for illustrating a shake compensation apparatus according to a tenth embodiment of the present invention in conjunction with FIG. 24.

FIG. 23 is a block diagram showing a configuration example of the estimator 905 of the shake compensation apparatus according to the tenth embodiment. The difference between the configurations shown in FIGS. 22 and 23 is as follows:

(1) a calculation unit 2701 that calculates the estimated parallel velocity in a control period (1 sampling period) 1 unit before, and a panning and attitude determination unit 2702 are provided instead of the angular velocity meter 108 and the panning and attitude determination unit 2206; and (2) the estimated parallel velocity at a control period one unit earlier is input from the calculation unit 2701 to the panning and attitude determination unit 2702.

The tenth embodiment differs from the ninth embodiment in the following respect.

The estimated parallel velocity that is the output of the addition unit 1005 is input to the calculation unit 2701, which stores the estimated parallel velocity for calculating the next control period. That is, the calculation unit 2701 is a delay means that holds the estimated parallel velocity in the previous control period, the output of which is sent to the panning and attitude determination unit 2702, and it is determined if the apparatus is performing a panning operation and undergoing an attitude change. The determination result is input to the cutoff setting unit 2601. The subsequent processes are similar to those in the ninth embodiment.

The process until the parallel velocity is estimated from the panning determination result in the panning and attitude determination unit 2702 is described below using FIG. 24.

Figure 24:
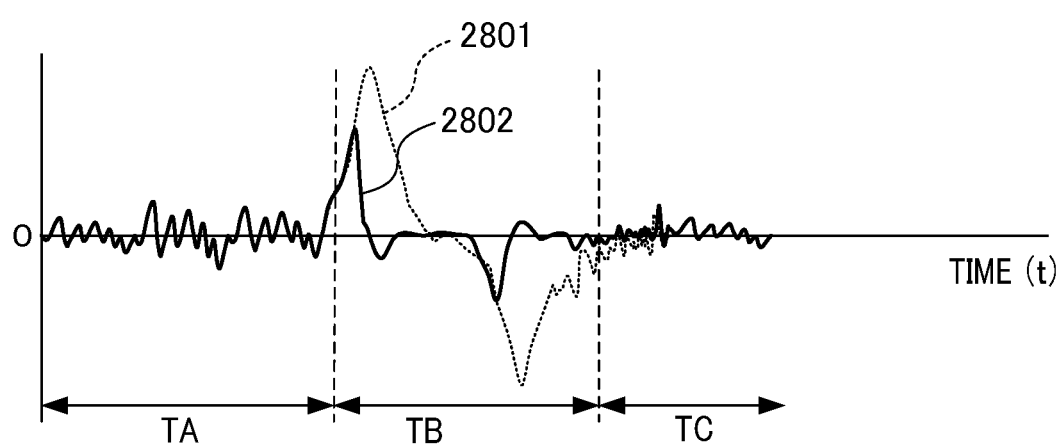
FIG. 24 is a diagram illustrating estimated parallel velocity.

The estimated parallel velocity 2801 shown in FIG. 24 is the parallel velocity estimated by the Kalman filter 1001 if the cutoff setting unit 2601 does not alter the cutoff frequencies of the variable HPFs 2602 and 2603. In addition, the estimated parallel velocity 2802 is the parallel velocity estimated by the Kalman filter 1001 if the cutoff setting unit 2601 does not alter the cutoff frequencies of the variable HPFs 2602 and 2603 in response to the determination result of the panning and attitude determination unit 2702.

In the period TA in FIG. 24, a user is in an ordinary hand-held state without performing panning, the panning and attitude determination unit 2702 outputs a determination signal that indicates "panning non-operation". In the period TB, it is determined that the apparatus is performing a panning operation and undergoing an attitude change based on the estimated parallel velocity. The panning and attitude determination unit 2702 determines that the apparatus is performing a panning operation and undergoing an attitude change if the estimated parallel velocity continues to be equal to or greater than a threshold for the predetermined time or more. Or, it can also determine that the apparatus is performing a panning operation and undergoing an attitude change if the estimated parallel acceleration that is a first-order differential of the estimated parallel velocity continues to be equal to or greater than a threshold for the predetermined time or more. Alternatively, it may determine that the apparatus is in a panning operation and in an attitude change if the estimated parallel velocity continues to be equal to or greater than a threshold for the predetermined time or more, and the estimated parallel acceleration continues to be a equal to or greater than threshold for the predetermined time or more.

The cutoff frequencies of the variable HPFs 2602 and 2603 are set to a higher degree than usual by the cutoff setting unit 2601 in a certain period if the apparatus is determined to be performing a panning operation and undergoing an attitude change. In the example in FIG. 14, the parallel velocity is estimated in conformity to the magnitude of an ordinary hand tremble during the panning non-operation shown in the periods TA and TC. In a panning operation shown in the period TB, the filter cutoff frequency of a variable HPF is set to a higher degree than usual, and the estimated parallel velocity is controlled to be small. For this, it is necessary to prevent mistaken estimation of parallel velocity in, particularly, the period TC.

The cutoff frequencies of the variable HPFs 2602 and 2603 are set to intentionally make the estimated parallel velocity smaller under a condition in which the parallel velocity becomes very great due to the influence of gravitational acceleration in association with the attitude change of the apparatus and the influence of disturbance acceleration due to a panning operation. Thereby, the over-compensation in shake compensation according to translational shake compensation can be prevented in a panning operation and in attitude change.

Moreover, in the tenth embodiment, a configuration is adopted in which the setting of the variable HPFs 2602 and 2603 is altered in accordance with the determination result of panning and attitude change. However, the above-described configuration can also be applied if the Kalman gain is altered as in the first embodiment, and if the input variable gain is altered in the first part of the Kalman filter as in the eighth embodiment. In this case, by performing the determination of panning and attitude change from the estimated parallel velocity in the previous control period, the over-compensation in shake compensation in translational shake compensation can be prevented in a panning operation and an attitude change.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-130614 and 2011-130615 both filed on Jun. 10, 2011 which are hereby incorporated by reference herein in their entirety.

What is claimed is:

1. A shake compensation apparatus configured to compensate a shake, the apparatus comprising:

a shake compensation unit configured to be moved non-parallel to an optical axis to compensate the shake;

a driving unit configured to drive the shake compensation unit based on a drive indication signal;

a position detection unit configured to detect a position of the shake compensation unit to output a position detection signal; and a compensation amount calculation unit configured to:
   detect a translational shake component in the shake of the apparatus from the movement of the shake compensation unit based on the drive indication signal and the position detection signal; and
   calculate a compensation amount of the shake compensation unit from a shake amount of the apparatus including the translational shake component and output it as the drive indication signal to the driving unit.

2. The apparatus according to claim 1, wherein:
the shake compensation unit comprises a driven unit,
the compensation amount calculation unit comprises an observer unit comprising vibration models of the shake compensation unit; and
a translational shake is calculated using the observer unit.

3. The apparatus according to claim 2, wherein the observer unit is an estimator using a Kalman filter performing a calculation of the translational shake, a relative displacement between the driven unit and a fixing unit supporting the driven unit serves as a state variable, and a driving thrust to the shake compensation unit serves as an input variable.

4. The apparatus according to claim 2, further comprising:
an attitude determination unit configured to at least determine a panning state of the apparatus, or an attitude change of the apparatus,
wherein the observer unit alters parameters so that a calculation result according to the translational shake is small if the attitude determining unit determines that the panning state or the attitude change of the apparatus occurs, compared to if the attitude determining unit determines that the panning state or the attitude change of the apparatus does not occur.

5. The apparatus according to claim 4, wherein:
the observer unit is an estimator using a Kalman filter performing a calculation of the translational shake, a relative displacement between the driven unit and a fixing unit supporting the driven unit serves as a state variable, and a driving thrust to the shake compensation unit serves as an input variable, and
a gain of the Kalman filter is altered as an alteration of the parameters.

6. The apparatus according to claim 2, further comprising:
an angular velocity detection unit configured to detect an angular velocity of the shake of the apparatus and output an angular velocity signal,
wherein the compensation amount calculation unit comprises:
a first compensation amount calculation unit configured to calculate a compensation amount of rotational shake caused in association with rotation of the apparatus centered on an axis perpendicular to the optical axis of an imaging optical system, using the angular velocity detection signal; and
a second compensation amount calculation unit configured to calculate a compensation amount of translational shake using the observer unit, a relative displacement between the driven unit and a fixing unit supporting the driven unit serving as a state variable, and a driving thrust to the shake compensation unit serving as an input variable, wherein the driving unit drives the shake compensation unit in accordance with a compensation amount calculated by synthesizing the compensation amount of rotational shake and the compensation amount of translational shake.

7. The apparatus according to claim 6, wherein the second compensation amount calculation unit comprises:
a compensation coefficient calculation unit configured to calculate a compensation coefficient from an estimated velocity of the translational shake calculated by the observer unit, and the angular velocity detection signal; and
an output compensation unit configured to compensate an output of the first compensation amount calculation unit, using the compensation coefficient calculated by the compensation coefficient calculation unit.

8. The apparatus according to claim 6, wherein:
the observer unit is an estimator using a Kalman filter performing a calculation of the translational shake, a relative displacement between the driven unit and a fixing unit supporting the driven unit serves as a state variable, and a driving thrust to the shake compensation unit serves as an input variable,
a gain of the Kalman filter is altered as an alteration of the parameters,
the apparatus further comprises:
a determination unit configured to detect a wobble state from the angular velocity of the shake of the apparatus based on a threshold; and
a gain determination unit configured to alter the gain of the Kalman filter that has been previously set based on a determination result of the determination unit.

9. The apparatus according to claim 6, further comprising:
a variable gain unit for the drive indication signal or the position detection signal to be input to the driven unit;
a determination unit configured to detect a wobble state from the angular velocity of the shake of the apparatus based on a threshold; and
a gain determination unit configured to alter a gain of the variable gain unit based on a determination result of the determination unit.

10. The apparatus according to claim 6, further comprising:
a high-pass filter for the drive indication signal or the position detection signal to be input to the driven unit;
a determination unit configured to detect a wobble state from the angular velocity of the shake of the apparatus based on a threshold; and
a setting unit configured to alter a cutoff frequency of the high-pass filter based on a determination result of the determination unit.

11. A shake compensation control method performed by a shake compensation apparatus configured to compensate a shake by driving a shake compensation unit, the method comprising:
a driving step of driving the shake compensation unit based on a drive indication signal;
a position detection step of detecting a position of the shake compensation unit to output a position detection signal;
a compensation amount calculation step of:
   detecting a translational shake component in the shake of the apparatus from the movement of the shake compensation unit, based on the drive indication signal and the position detection signal;
   calculating a compensation amount of the shake compensation unit from a shake amount of the apparatus including the translational shake component and outputting it as the drive indication signal in the driving step.

12. A shake compensation apparatus comprising:
- a processor programmed to output a compensated drive signal;
- a shake compensation unit configured to be moved non-parallel to an optical axis, based on the compensated drive signal received from the processor, to compensate a shake induced to the apparatus; and
- a position detecting device that detects a position of the shake compensation unit and outputs a position detection signal,
- wherein the processor is programmed to further:
  - detect a translational shake component in the shake induced to the apparatus, from the movement of the shake compensation unit, based on a previous drive indication signal already output to the shake compensation unit and a current position detection signal;
  - calculate a translational compensation amount of the shake compensation unit from a shake amount of the apparatus; and
  - output the calculated translational compensation amount as a current drive indication signal to the shake compensation unit.

13. A shake compensation control method performed by a shake compensation apparatus configured to compensate a shake by driving a shake compensation unit, the method comprising:
- a driving step of driving the shake compensation unit based on a drive indication signal;
- a position detection step of detecting a position of the shake compensation unit to output a position detection signal;
- a compensation amount calculation step of:
  - detecting a translational shake component of the shake of the apparatus from the movement of the shake compensation unit, based on a previous drive indication signal already sent to the driving unit and a current position detection signal;
  - calculating a translational compensation amount of the shake compensation unit from a shake amount of the apparatus; and
  - outputting the calculated translational compensation amount as a current drive indication signal to the shake compensation unit.

* * * * *